United States Patent
Lane

[11] Patent Number: 5,823,784
[45] Date of Patent: Oct. 20, 1998

[54] ELECTRIC FIRE SIMULATOR

[76] Inventor: Kerry S. Lane, 255 Glenway Cir., Newmarket Ontario, Canada, L3Y 7S6

[21] Appl. No.: 442,209

[22] Filed: May 16, 1995

[30] Foreign Application Priority Data

May 16, 1994 [GB] United Kingdom .................. 9409790

[51] Int. Cl.$^6$ .................................................. G09B 19/00
[52] U.S. Cl. ............................................................ 434/226
[58] Field of Search ...................................... 434/226, 219

[56] References Cited

U.S. PATENT DOCUMENTS 4,001,949  1/1977  Francis ..................................... 434/226
5,059,124  10/1991  Tsujita ..................................... 434/226

*Primary Examiner*—Richard J. Apley
*Assistant Examiner*—John Edmund Rovnak
*Attorney, Agent, or Firm*—Fried, Frank, Harris, Shriver & Jacobson; Jeffrey D. Sullivan

[57] ABSTRACT

A fire fighting simulator includes a projector to project an image of a fire on a screen and a shutter assembly to occlude portions of the image. The extinguishing agent is simulated by an infrared beam and the shutter assembly is controlled to occlude portions at locations impinged by the beam. The control also polls each element of the shutter assembly periodically and opens the elements selectively to simulate reflash of the fire.

14 Claims, 21 Drawing Sheets

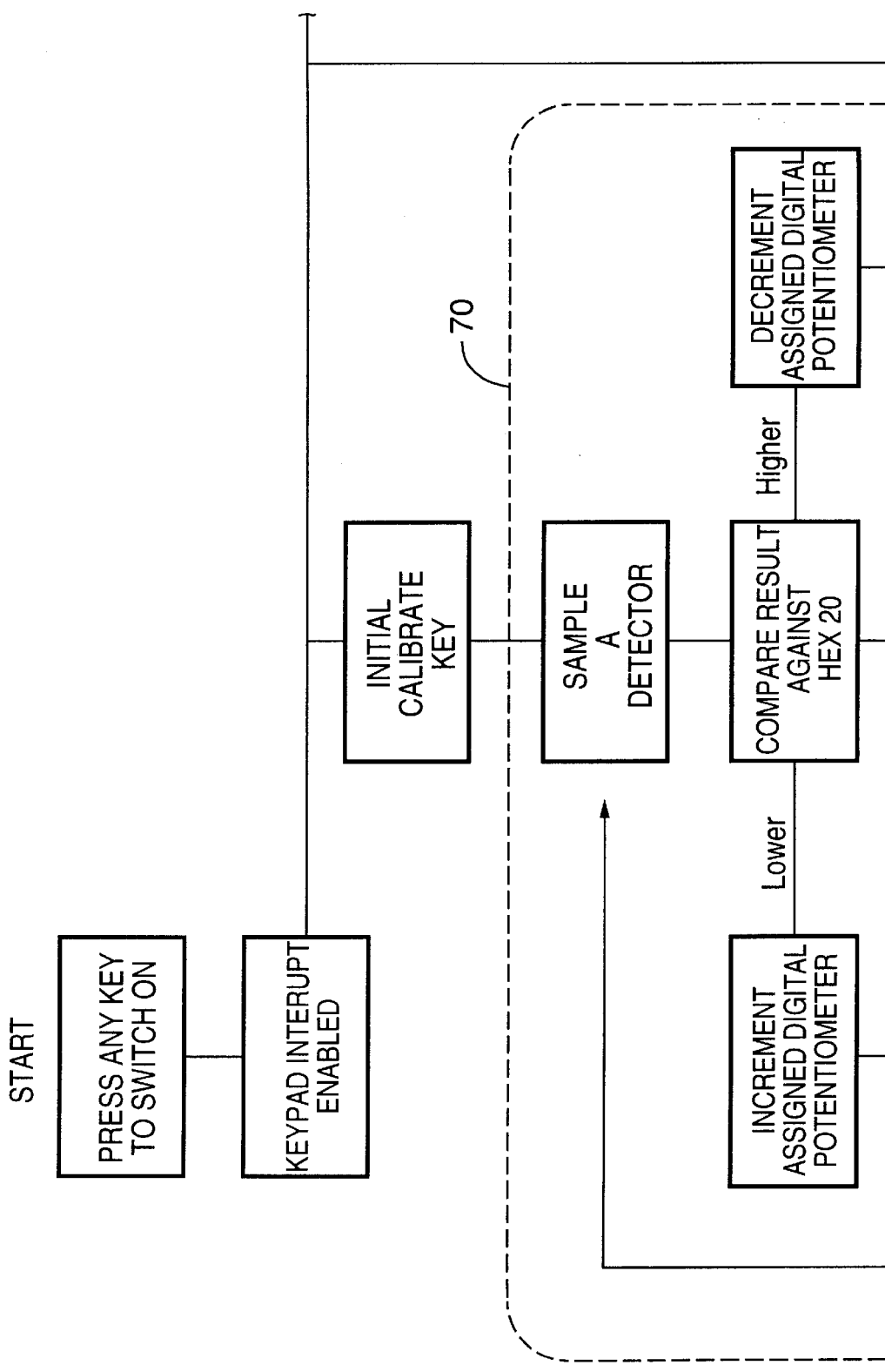

```
                    ┌──────────────┐
                    │ Start Cycle  │
                    │ Program Loop │
                    └──────┬───────┘
                           │────────────────────────────┐
                           ▼                            ▼
                ┌──────────────────┐          ┌──────────────┐
            ┌──▶│ Calculate Column │          │   Shutter    │
            │   │     Spread       │          │   Interrupt  │
            │   └────────┬─────────┘          └──────┬───────┘
            │            ▼                           ▼
            │   ┌──────────────────┐          ┌──────────────┐
       140 ─┼───│   Apply Agent    │          │ Shutter Data │──148
            │   │   Horizontally   │          │   Transmit   │
            │   └────────┬─────────┘          └──────┬───────┘
            │            ▼                           ▼
            │   ┌──────────────────┐          ┌──────────────┐
       142 ─┼───│   Apply Agent    │          │ Exit Routine │
            │   │    Vertically    │          └──────────────┘
            │   └────────┬─────────┘
            │            ▼
            │   ┌──────────────────┐
       144 ─┼───│  Cause Reflash   │
            │   │   Horizontally   │
            │   └────────┬─────────┘
            │            ▼
            │   ┌──────────────────┐
       146 ─┼───│  Cause Reflash   │
            │   │    Vertically    │
            │   └────────┬─────────┘
            │            ▼
            │   ┌──────────────────┐
            │   │   Check Fire     │
            │   │     Width        │
            │   └────────┬─────────┘
            │            ▼
            │   ┌──────────────────┐
            │   │  Load Shutter    │
            │   │      Data        │
            │   └────────┬─────────┘
            └────────────┘
```

FIG.15A

ELECTRIC FIRE SIMULATOR

The present invention relates to a fire simulator and fire fighting training device.

In many sectors of North American industry it is mandatory that "hands on" fire training be provided on a regular basis. Fighting a variety of fires in many locales is impractical or in some cases prohibited.

One prior proposal for a fire fighting simulator is shown in U.S. Pat. No. 4,001,949 assigned to Ansul company. In this patent, the simulator comprises a motion picture projector, rear projection screen, a slide projector, a mechanical door shutter, compressed air cylinders, and a modified fire extinguisher.

The shutter assembly is placed between the projector and screen and a film loop of flame images is continually projected on to the screen. When the shutters are closed, the corresponding portion of the image is obliterated and the fire appears to be extinguished. The slide projector simultaneously projects an image of an item that is "on fire", for example a pan, desk or industrial valve, but the image is not obscured by the shutter. The compressed air is used to simulate the extinguishing agent emitted by the extinguisher and is directed to the front of the screen by the fire fighter.

The Ansul simulator uses load sensors around the screen to determine the impingement point of the compressed air on the screen. However, the load calls are prone to misalignment, particularly during transportation. Moreover, the mechanical shutter is prone to damage from broken wires, threads, and misaligned doors rendering the device generally unreliable.

The control strategy for the shutter shown in the Ansul patent utilises a pre-determined fire fighting sequence in an attempt to provide on-line responses which appear to anticipate a certain technique of attacking the fire. Such an approach however does not provide the student with a realistic experience as certain consequences will be anticipated by the controller rather than being effected by the student.

It is therefore an object of the present invention to obviate or mitigate the above disadvantages.

The simulator of the present invention utilises an LCD projector, slide projector and solid state shutter to provide a realistic electronically generated fire which is constantly monitored and controlled to simulate the actions of an actual fire when extinguishing is attempted using a suitably modified fire extinguisher. The extinguisher incorporates an infrared (I.R.) beam generator which may be directed so as to impinge upon the screen. The location of the impingement is detected by a suitable I.R. detector. The corresponding location on the shutter is rendered opaque to obliterate the image of the flames and indicate extinction of the fire.

The shutter is controlled by a computer which is programmed to simulate the characteristics of a fire. Thus the impingement of the bean may initially cause the computer to obliterate that part of the image but subsequently may restore the image if the extinguished portion is ignored or if an incorrect strategy is used.

Preferably, the shutter is located beyond the focal depth of the projector lens so that a progressive obliteration of the image is obtained.

By providing an electronically generated fire the fire training instructor is able to train students on proper extinguishing techniques without the hazards or pollution associated with lighting actual fires. This also allows training of students located in high density metropolitan areas where lighting fires may be prohibited and since training occurs indoors it can take place year round. Any number of different fires can be created to apply to hazards particular to specific industries.

The simulator computer will constantly monitor where the student is pointing the extinguisher nozzle and will extinguish the flames according to where the student is pointing the nozzle while taking into account the particular characteristics of the type of fire being generated.

An advantage of the preferred embodiment is the ability to simulate the characteristic of an actual fire and allow the student to attempt fire extinguishment. It creates various types of fires ensuring the fire closely reacts to the students attempts at extinguishment. It allows for the simulation of customized fires by photographing objects around a specific workplace, projecting these images on a rear projection screen and superimposing flame images generated by an LCD projector. It will be appreciated that different types of fires react differently to attempts at extinguishment and a variety of adjustments allow the instructor to take these differences into account. For example, the flames of a spill fire are fed by gently rising flammable vapours whereas a gas pressure fire is generally more intense with flames forced higher by the flow of gas. Similarly a paint locker fire provides a vertical surface which has its own particular flame characteristic.

The preferred embodiment also incorporates other external environmental factors such as wind conditions which may hamper fire extinguishment.

The components utilised enable a compact portable system to be provided which can be transported on skids or a small van and set up at the customers site in a conference room or other suitable area. The video sequences can be selected so that the simulator provides fire scenes which are familiar to the students, using the types of fires which are more likely to occur in their work environment. Fire training using different types of fire extinguishers can also be provided as the characteristics of the extinguishers may be taken into account when responding to the attempt at extinguishment. These characteristics include fire extinguisher range, agent type and size. The simulator may also provide in depth training by recording the students attempts at fire extinguishment and replaying them to provide the student with graphical reinforcement of where the nozzle was pointing, the sweep rate and sweep direction of the nozzle for post fire analysis.

Embodiments of the present invention will now be described by way of example only with reference to the accompanying drawings in which;

FIG. 7 is a representation of the effect of the shutter shown in FIG. 2 upon the image of FIG. 6;

FIG. 8 is a representation of an alternative embodiment to the shutter shown in FIG. 2;

Figure 14:
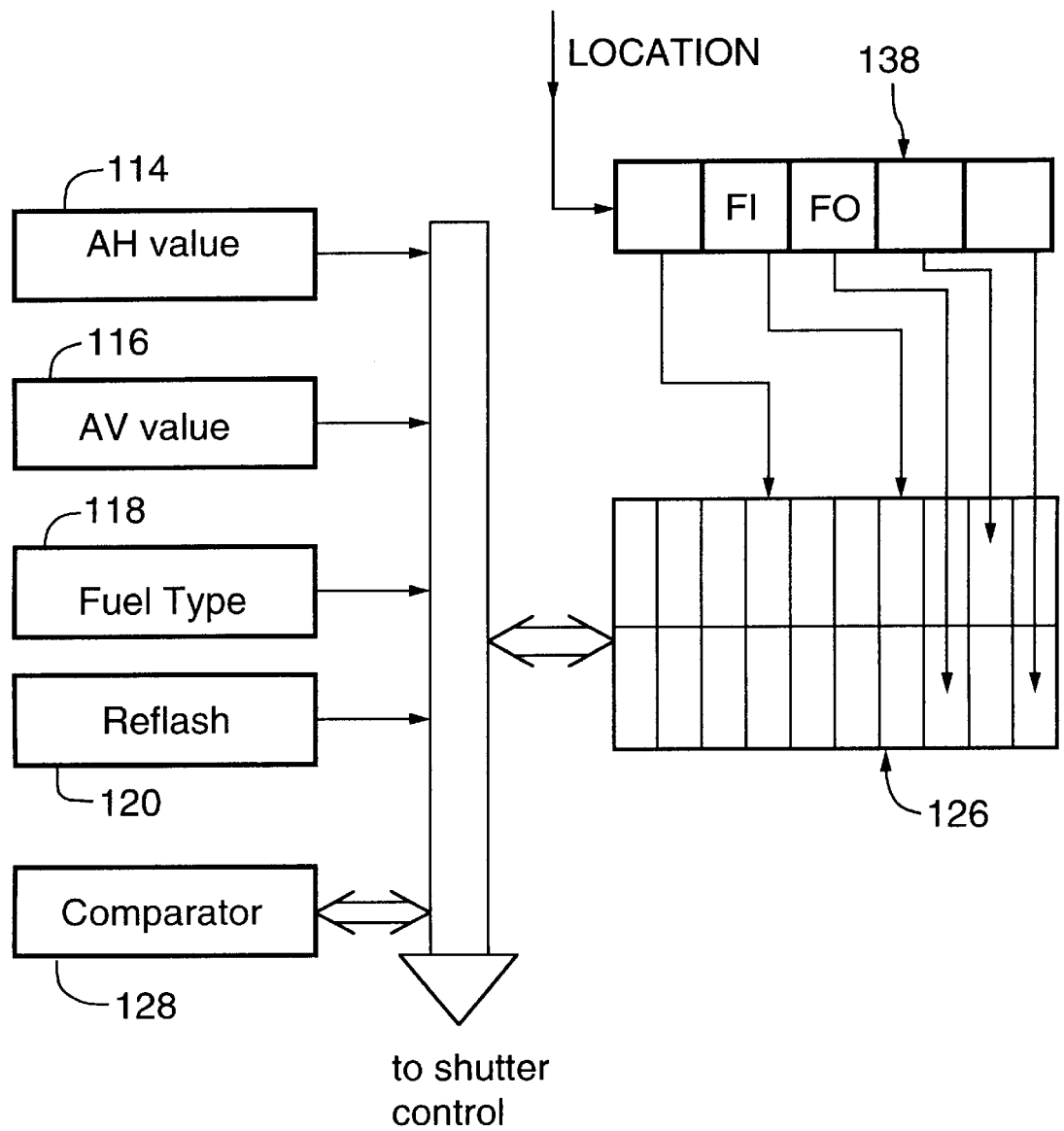
FIG. 14 is a schematic representation of the controller used with the control panel of FIG. 13.
Figure 15B:
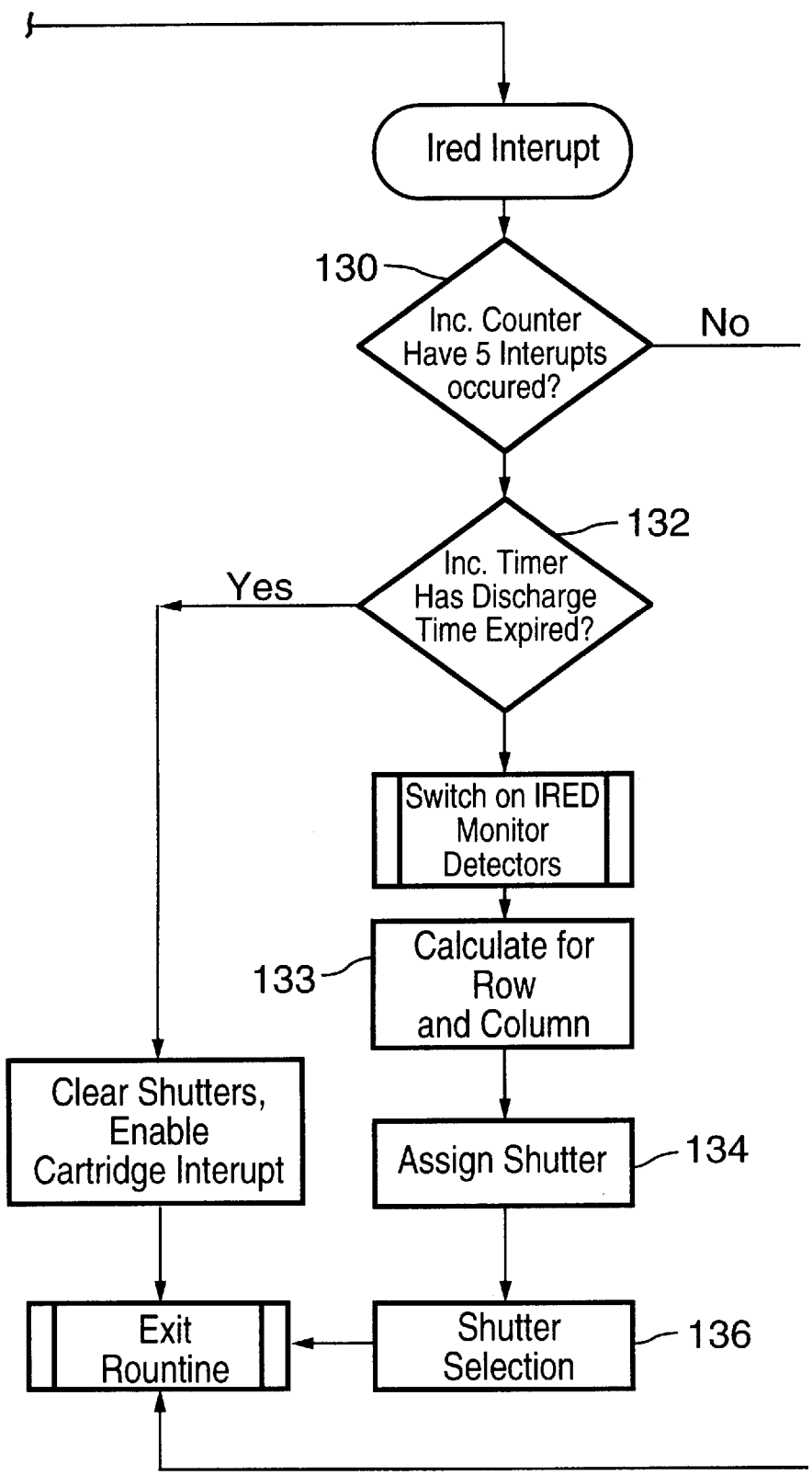
Figure 16:
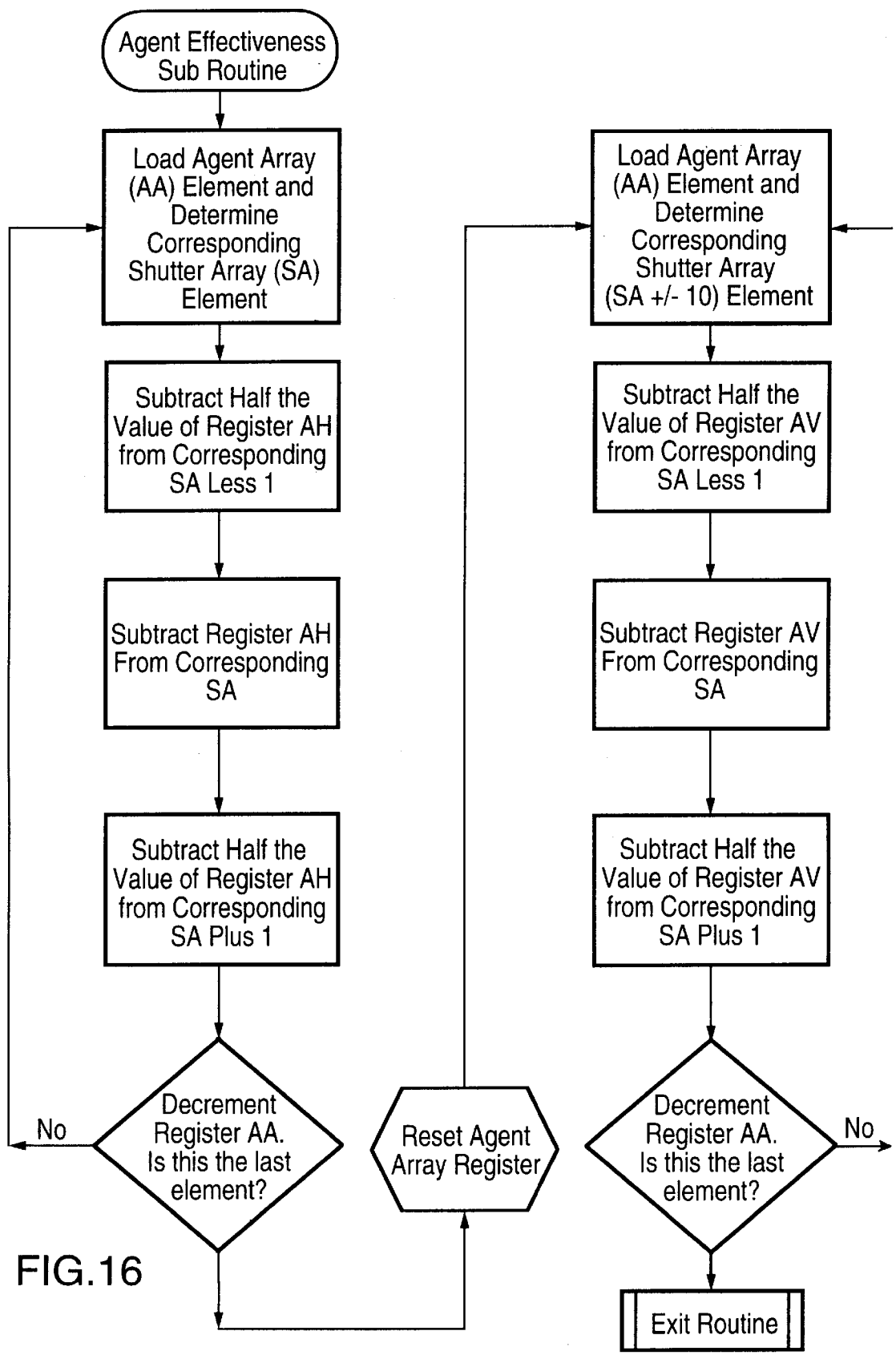
Figure 17:
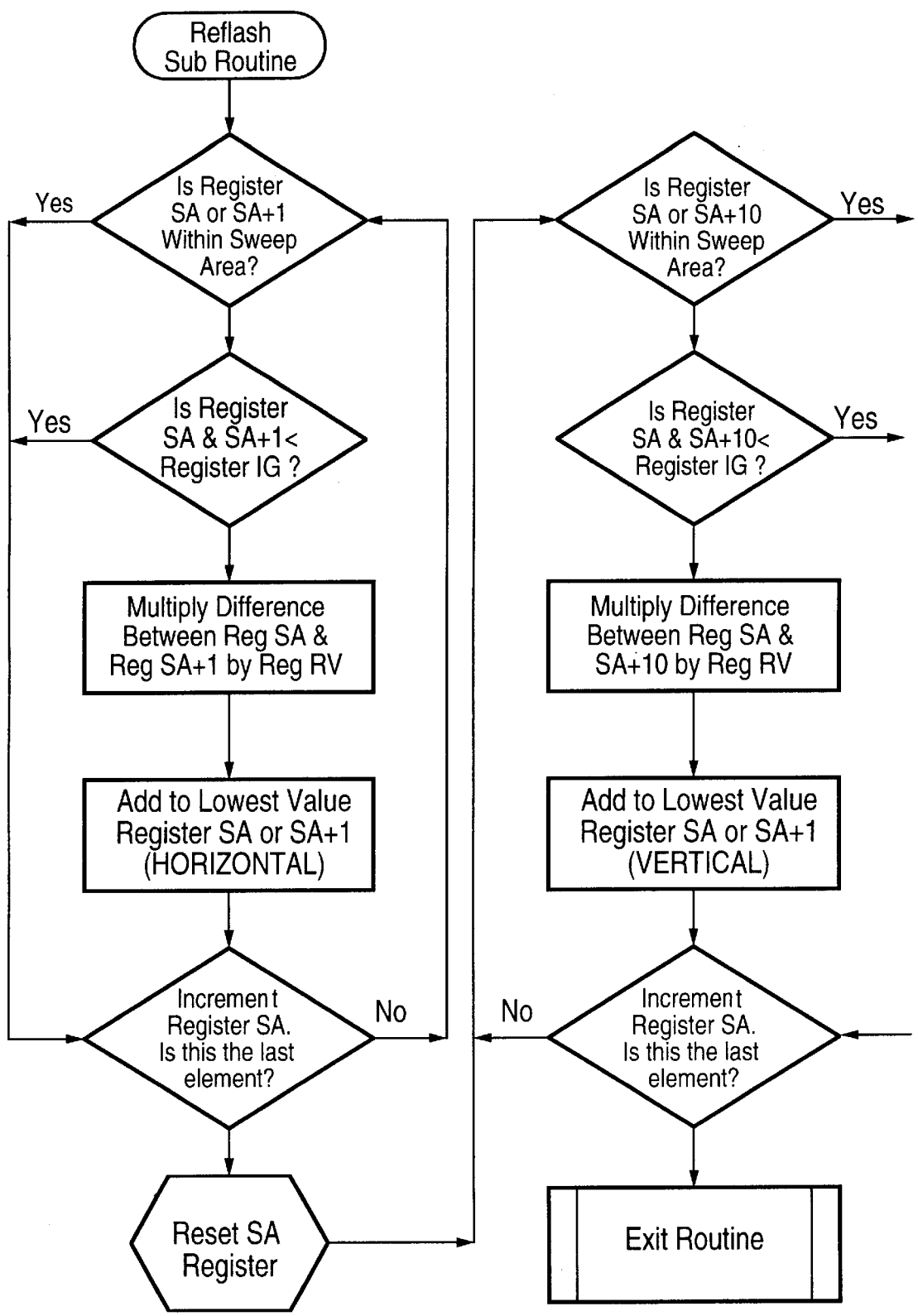

FIG. 15 in a flow chart showing the control strategy used with the controller of FIG. 14;

FIG. 16 is a sub-routine of the control strategy shown in FIG. 15;

FIG. 17 is a further sub-routine of the control strategy used in FIG. 15.

Figure 1:
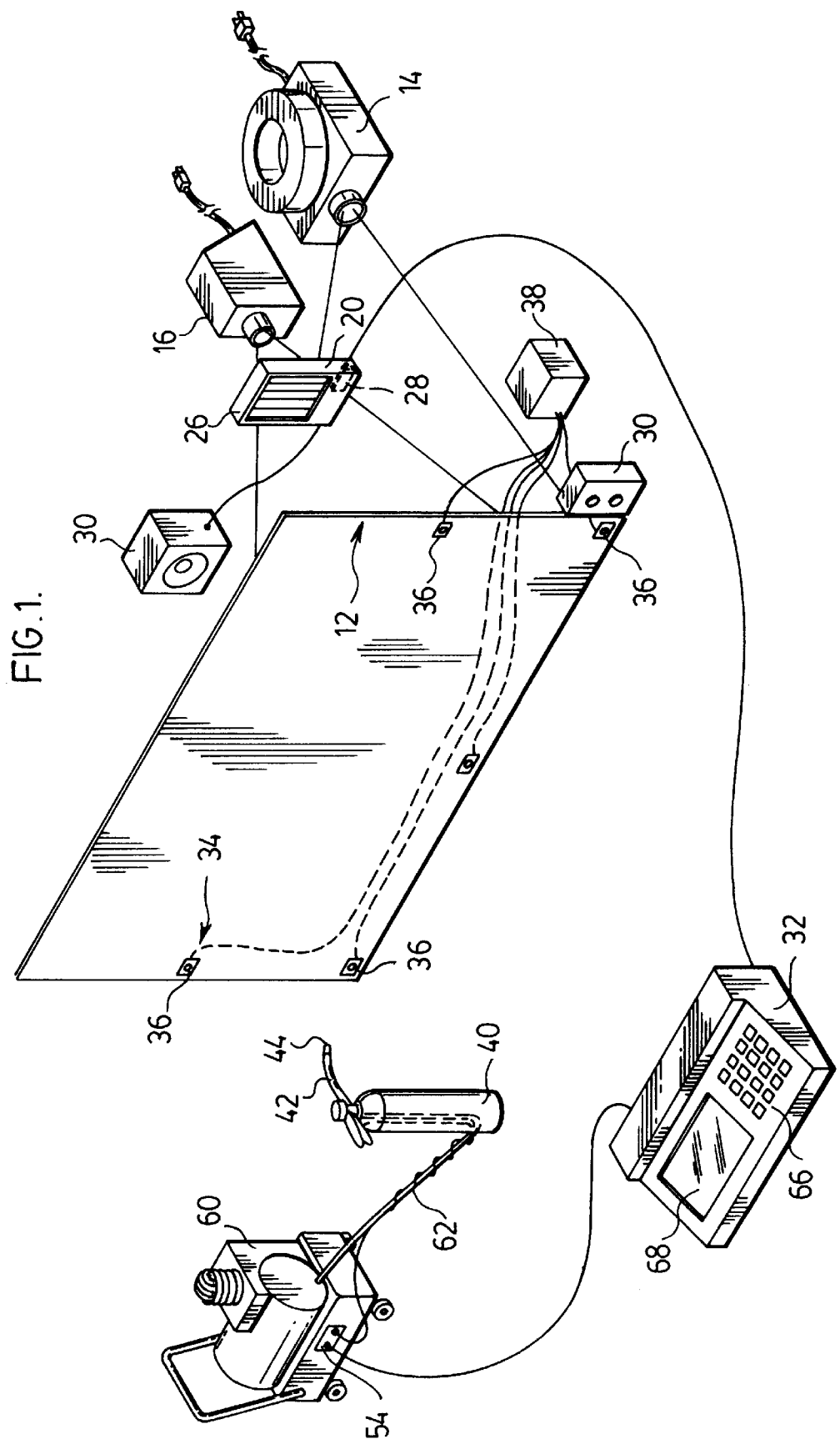
FIG. 1 is a schematic representation of a simulator.

Referring therefore to FIG. 1, a simulator 10 includes a rear projection screen 12. A slide projector 14 is positioned to the rear of the screen 12 to project an image from a slide cassette onto the screen. An LCD projector 16 is positioned adjacent to the slide projector 14 to project an overlapping image onto the rear of the screen 12.

Figure 2:
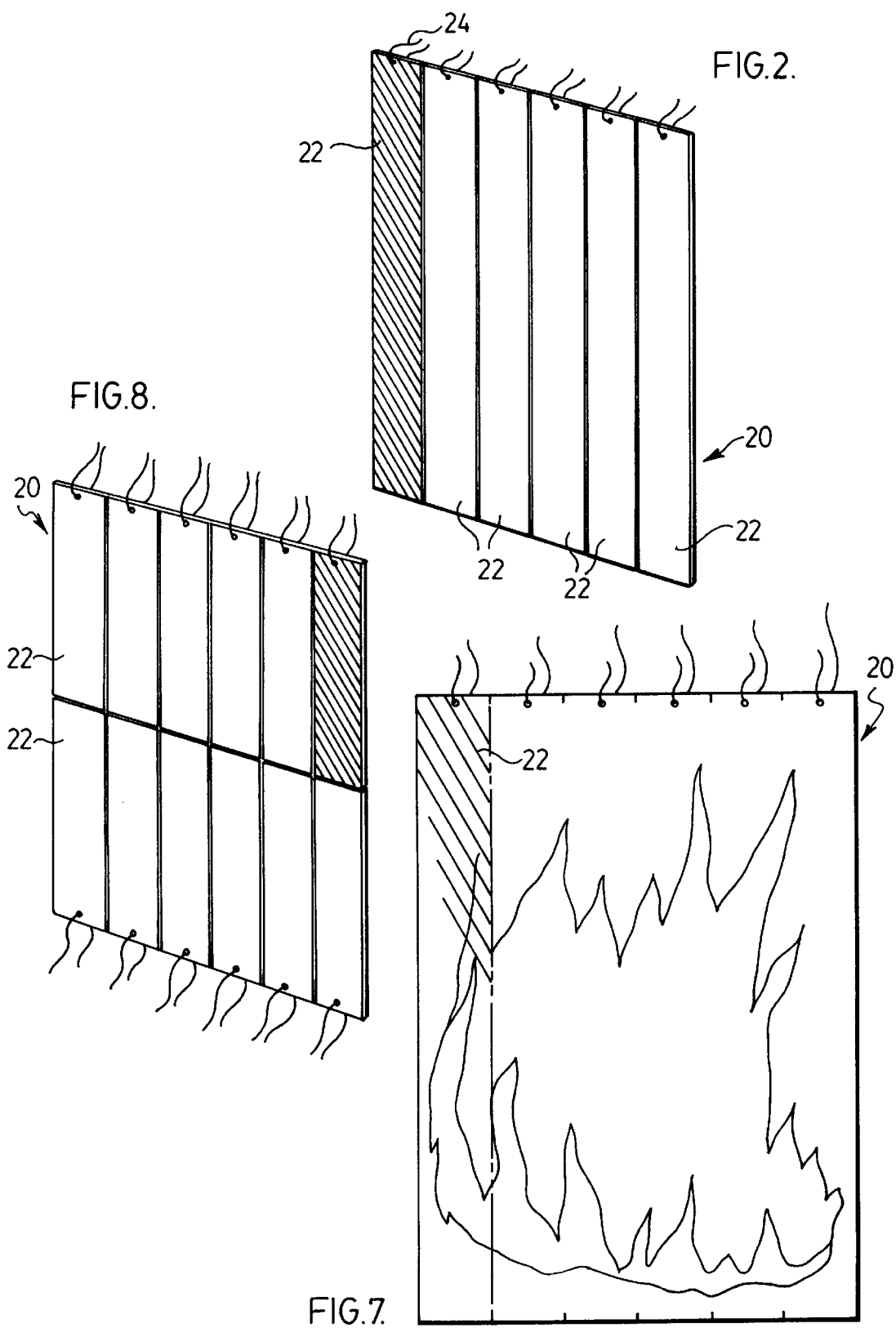
FIG. 2 is a representation of a shutter used in the simulator of FIG. 1.

A solid state shutter 20 is positioned between the LCD projector 16 and the screen 12 so that the image projected by the projector 16 passes through the shutter 20. As can be seen from FIG. 2, the shutter 20 includes a plurality of individual shutter elements referred to as cells 22. Typically there will be twenty cells 22 which are arranged in two rows of ten columns each and are formed from liquid crystal displays (LCD's). The transmissibility of each of the cells is controlled by the voltage applied to a pair of control wires 24 so that the cells are clear when a high voltage is applied and opaque in the absence of such a voltage. Each of the cells 22 selectively block parts of the projected image when rendered opaque to obliterate a portion of the image on the screen.

The shutter 20 is located within a housing 26 that also contains an audio amplification circuit 28. The audio output from the video projector 16 is connected to the amplifier 28 and from there to a pair of external speakers 30. The amplifier circuit 28 includes a volume control circuit having a digital potentiometer as a biasing resistor. The potentiometer is adjustable by means of a control signal applied from a controller 32 to vary the audio volume. Controller 32 also receives input from an infra-red detection system generally indicated at 34 and consisting of four individual detectors 36 positioned around the periphery of the screen 12. The output of the detectors 36 is connected to a comparator and controller assembly 38. The controller assembly 38 is connected through the controller 32 to operate upon the shutter assembly 20.

Figure 3:
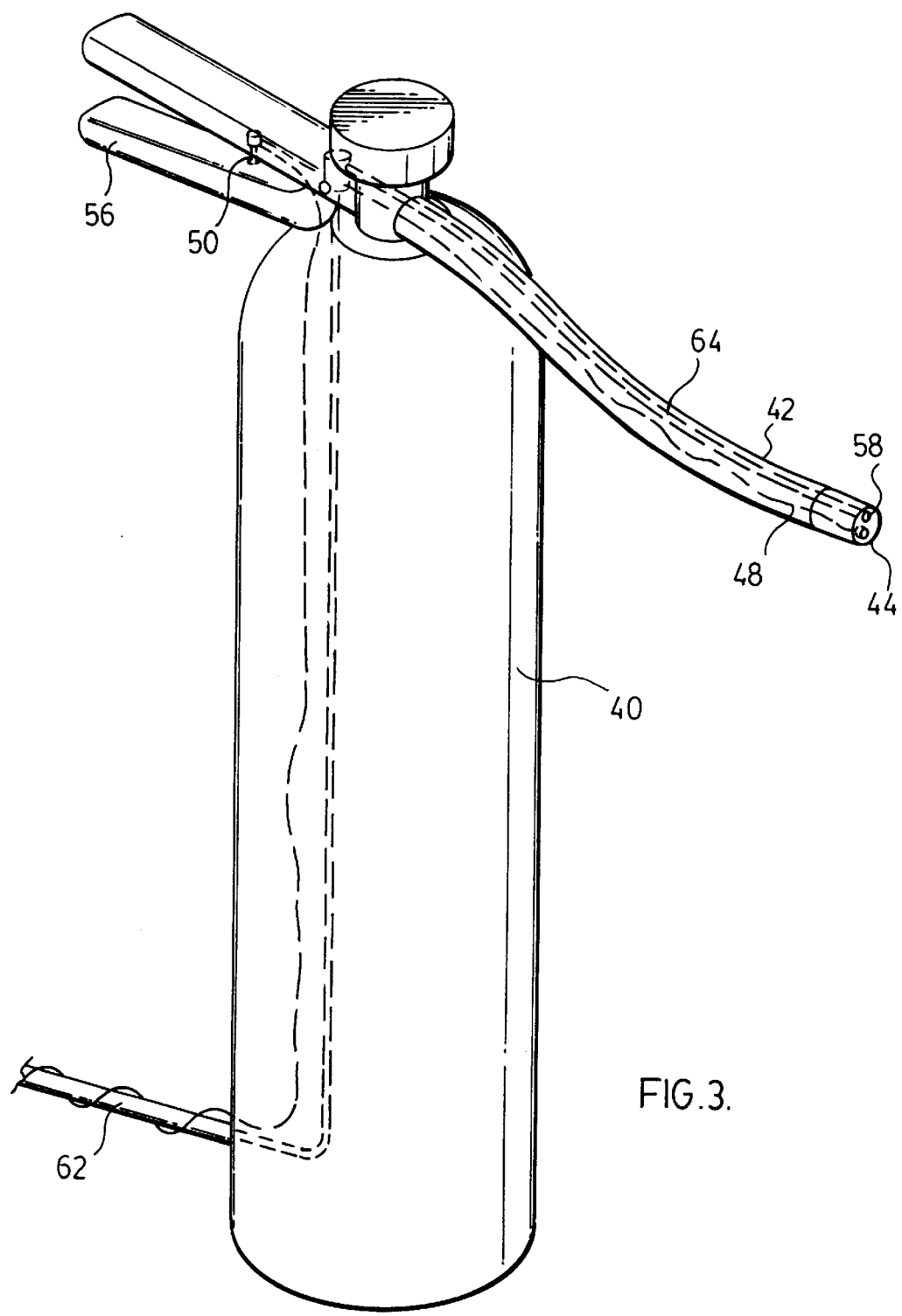
FIG. 3 is a view of an extinguisher used in conjunction with the simulator of FIG. 1.

A fire extinguisher 40 includes a nozzle 42 which has an infra-red emitting diode 44 located at the tip of the nozzle. Power to the diode is provided by a pair of wires 48 (FIG. 3) which are connected through a microswitch 50 to a power supply 54. The switch 50 is located within the operating handle 56 (FIG. 3) so that movement of the handle 56 to a position to actuate the extinguisher causes the switch 50 to close and provide power to the diode 44. A light 58 is located in the nozzle 42 to provide a visible beam to simulate the flow of fluid and indicate the point of impingement on the screen 34. The light 58 is also controlled by the switch 50 so it is on whenever the infra-red diode 44 is on.

Where the extinguisher is a type having a cartridge plunger, an additional microswitch may be located between the plunger to disable the diode until the plunger is operated. Similarly, if a ring pin is normally used to prevent inadvertent operation of the extinguisher then a microswitch will be actuated by removal of the ring pin to control power to the diode.

Compressed air is supplied to the interior of the extinguisher 40 from a compressor 60 through a hose 62. Flow through the hose is controlled by a solenoid operated valve (not shown) whose operation is controlled by the controller 32. The interior of extinguisher 40 is vented through a duct 64 in the nozzle 42 to simulate flow of fire retardant material.

The operation of the simulator will first be described in general terms with specific operation of the controller 32 described subsequently.

An image of the object on fire is projected by the slide projector 14 and an image of a fire is superimposed by the LCD projector 16. Initially all the shutters are transparent so that an image of the object on fire is displayed on the screen 34. The characteristics of the "fire" is determined by the controller 32 which controls the opening and closing of the shutters 20.

An attempt is made to 'fight' the fire displayed on the screen 34 by discharging the extinguisher 40. The handle 56 is operated to discharge compressed air and exit a visible and infra-red beam at the screen 34. The location of the impingement is determined by a comparison of the signals from the detectors 36. The controller then determines the effect of the impingement on the fire and closes the appropriate shutters 20 to provide an accurate simulation of the result obtained from the discharge of extinguisher 40.

The controller 32 will shut the solenoid valve controlling the flow of air after a predetermined time to indicate the complete discharge of the contents of the extinguisher 40 if the fire has not been previously extinguished. At the same time the light 58 and diode 44 are switched off.

Figure 10B:
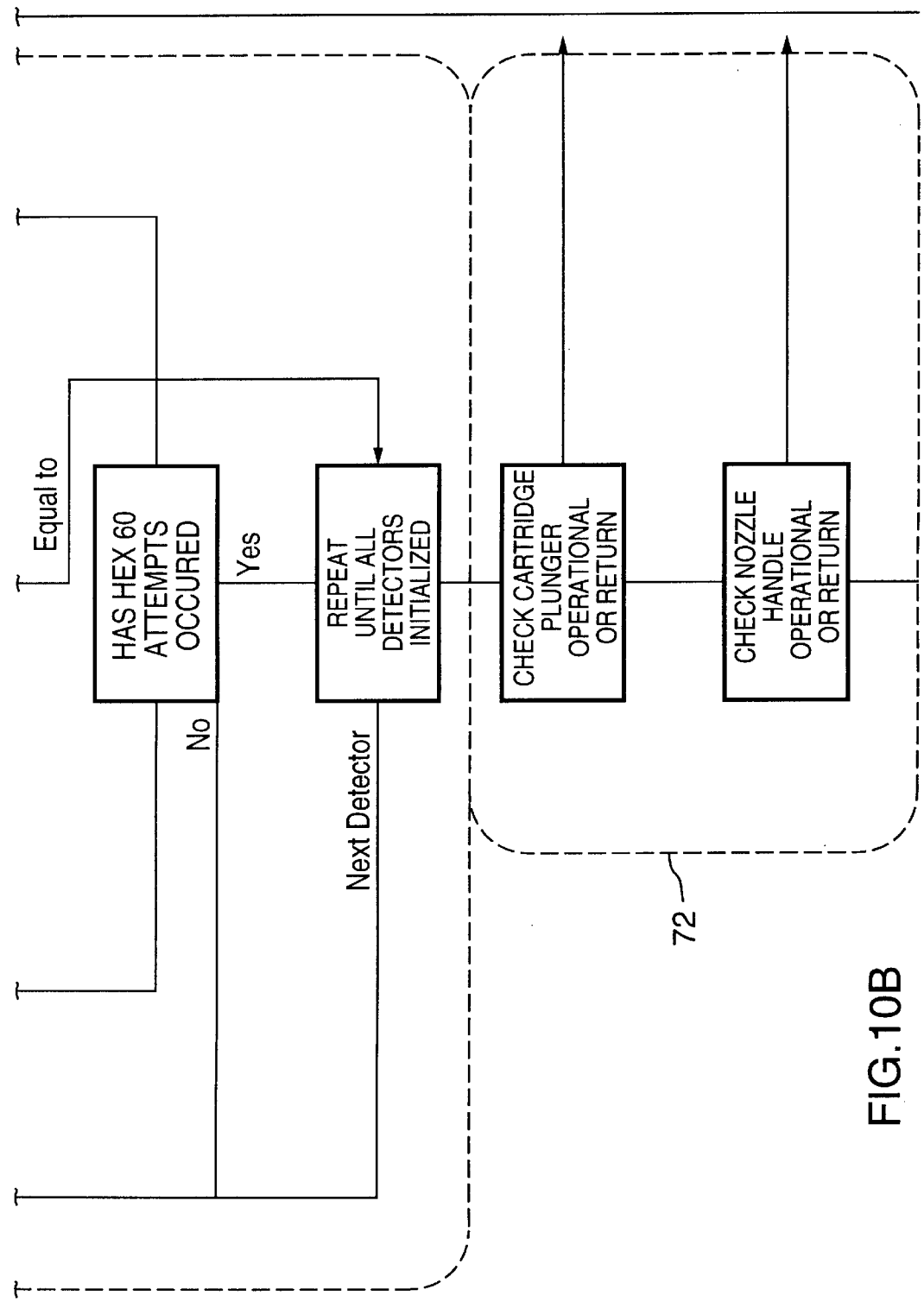
FIG. 10 is a flow diagram showing the initialization of the controller of the simulator shown in FIG. 1.
Figure 10C:
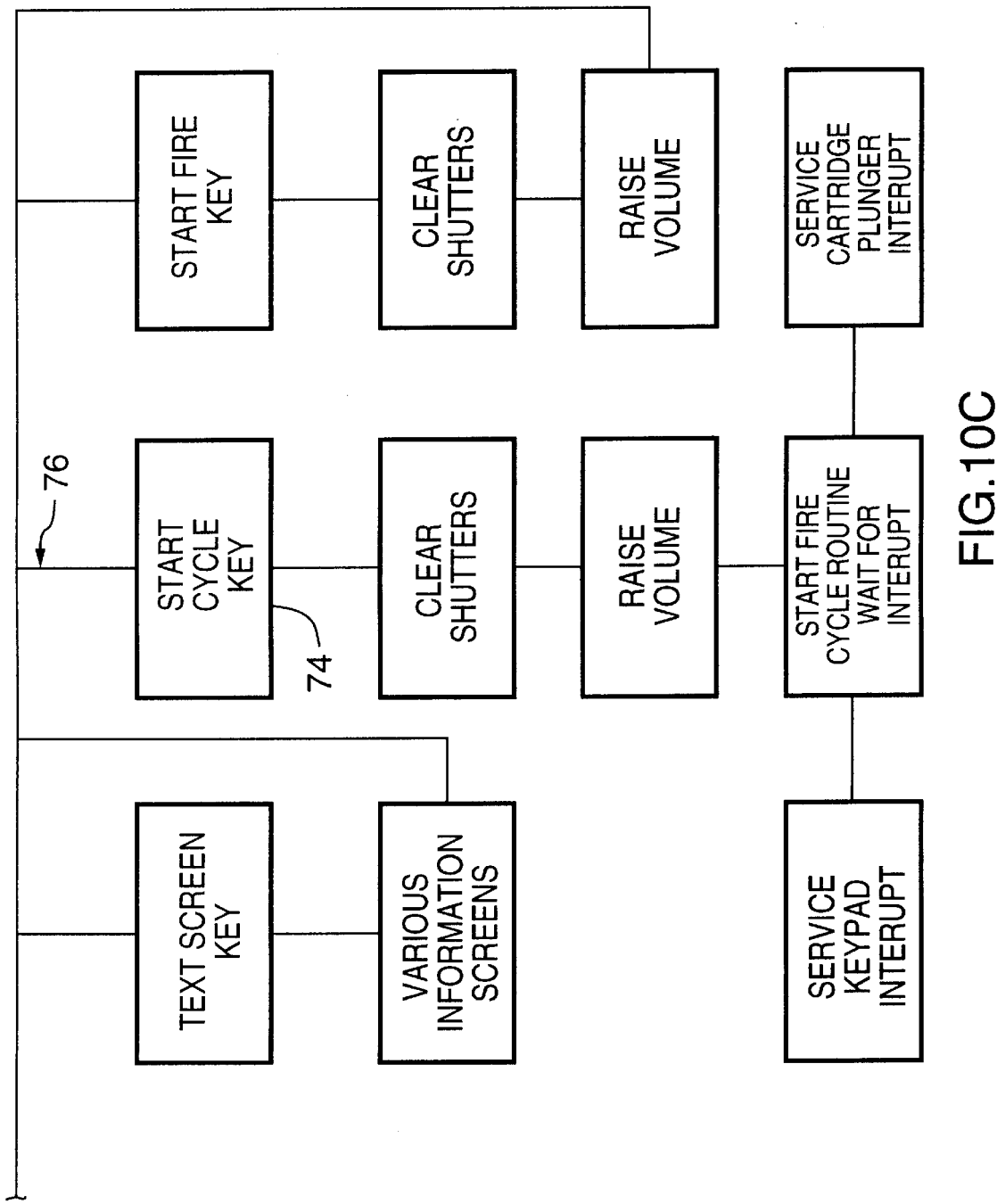
Figure 11A:
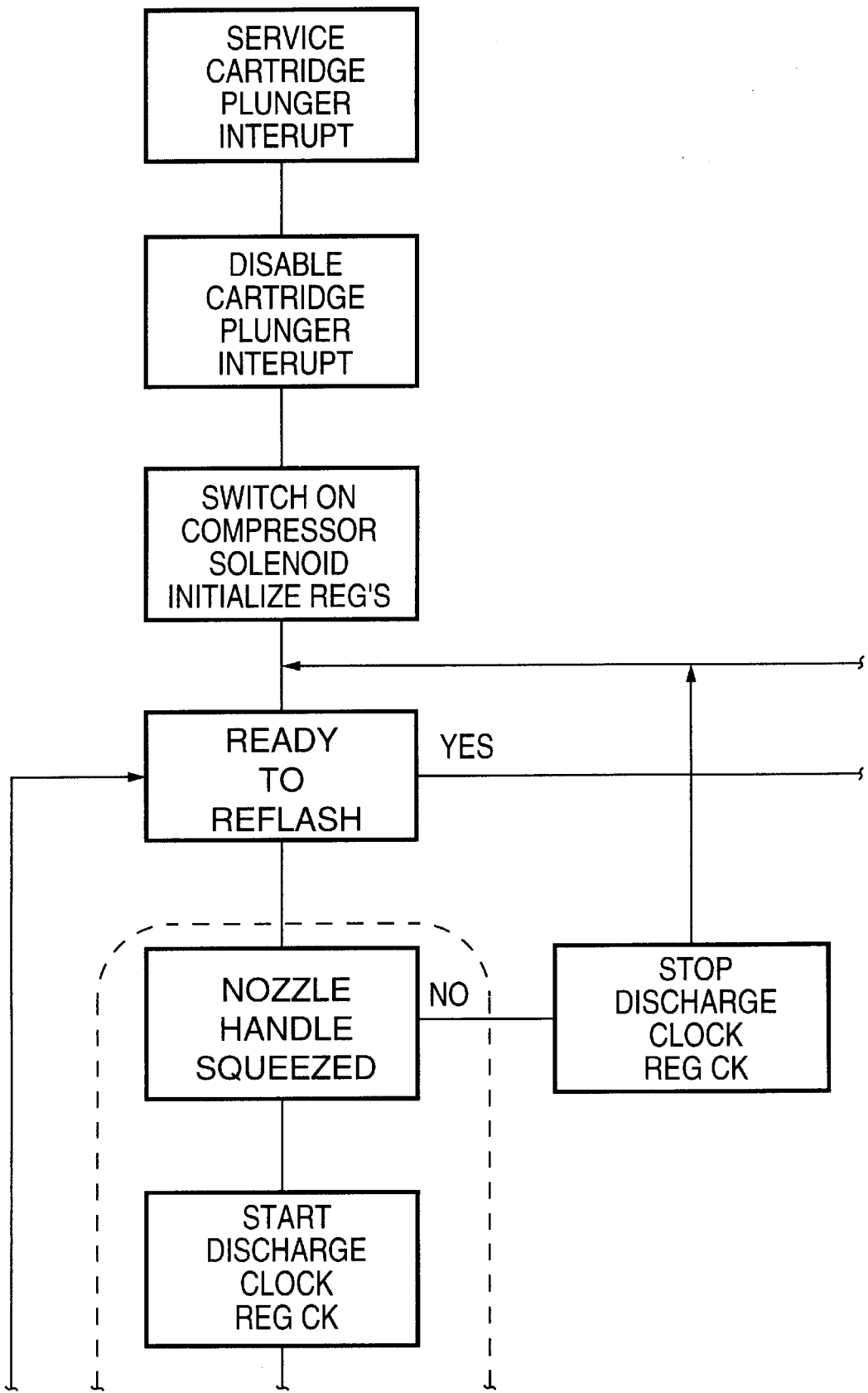
FIG. 11 is a flow diagram showing the sequence of events of the jointed simulation of a fire by the simulator of FIG. 1.
Figure 11B:
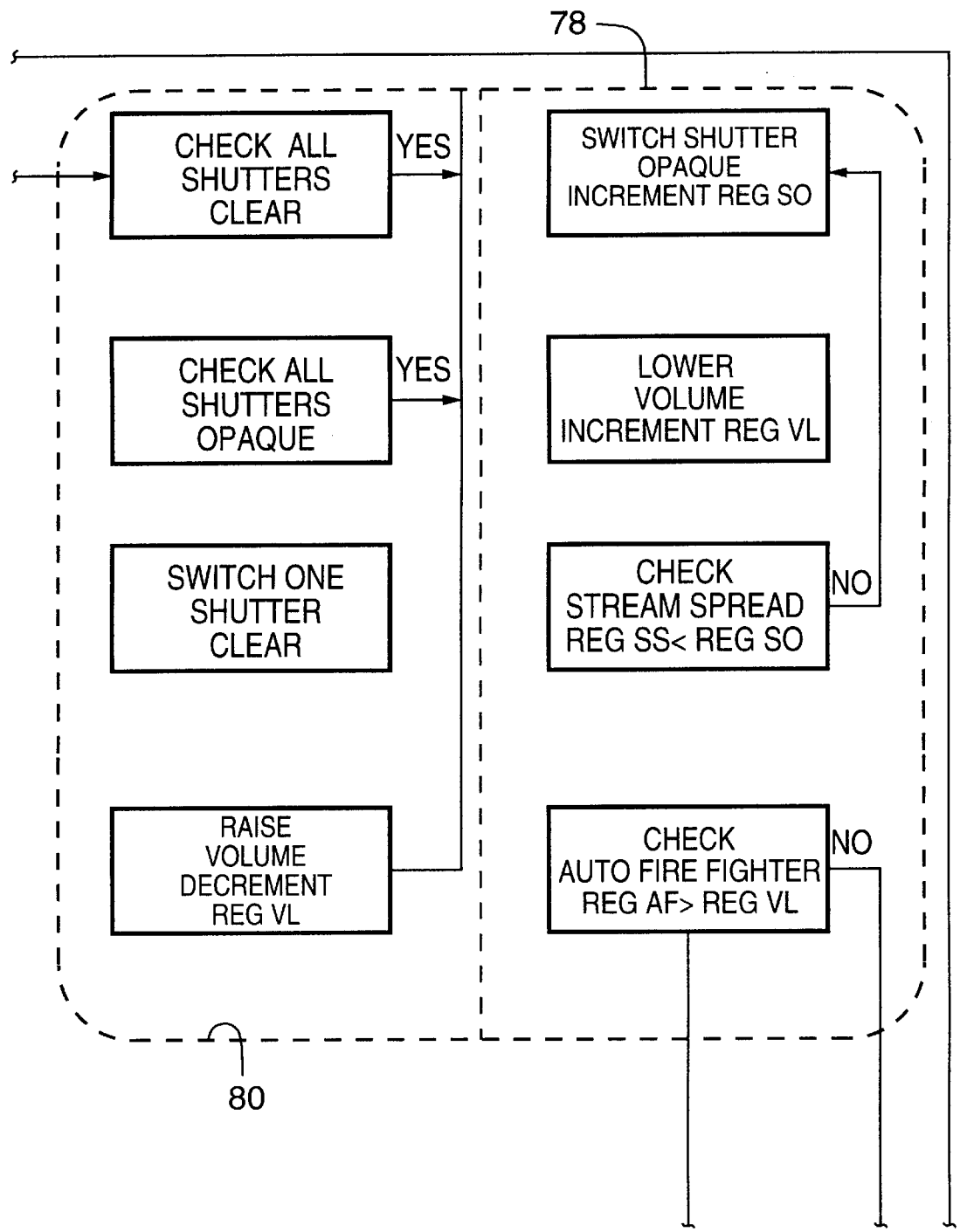
Figure 11C:
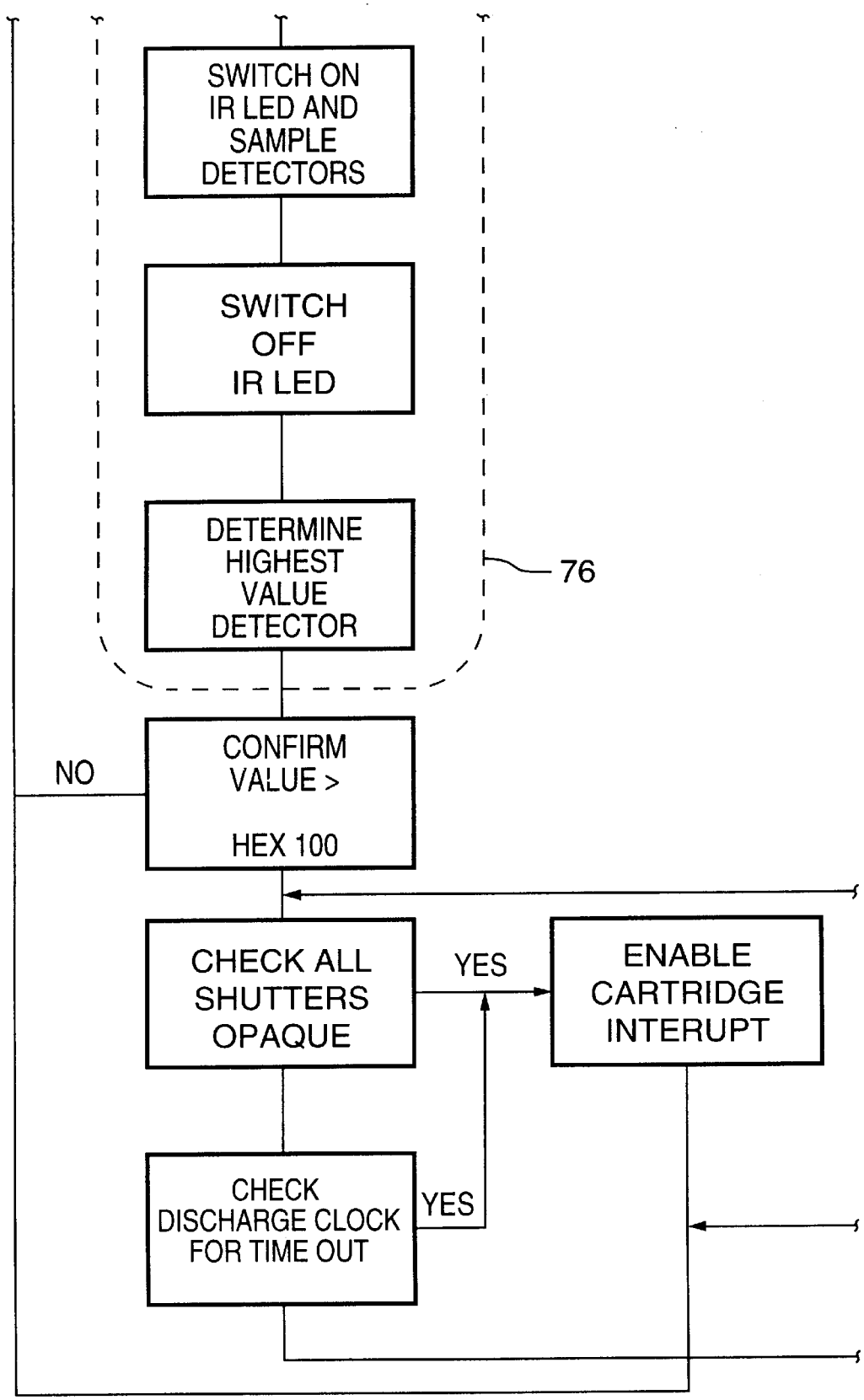
Figure 11D:
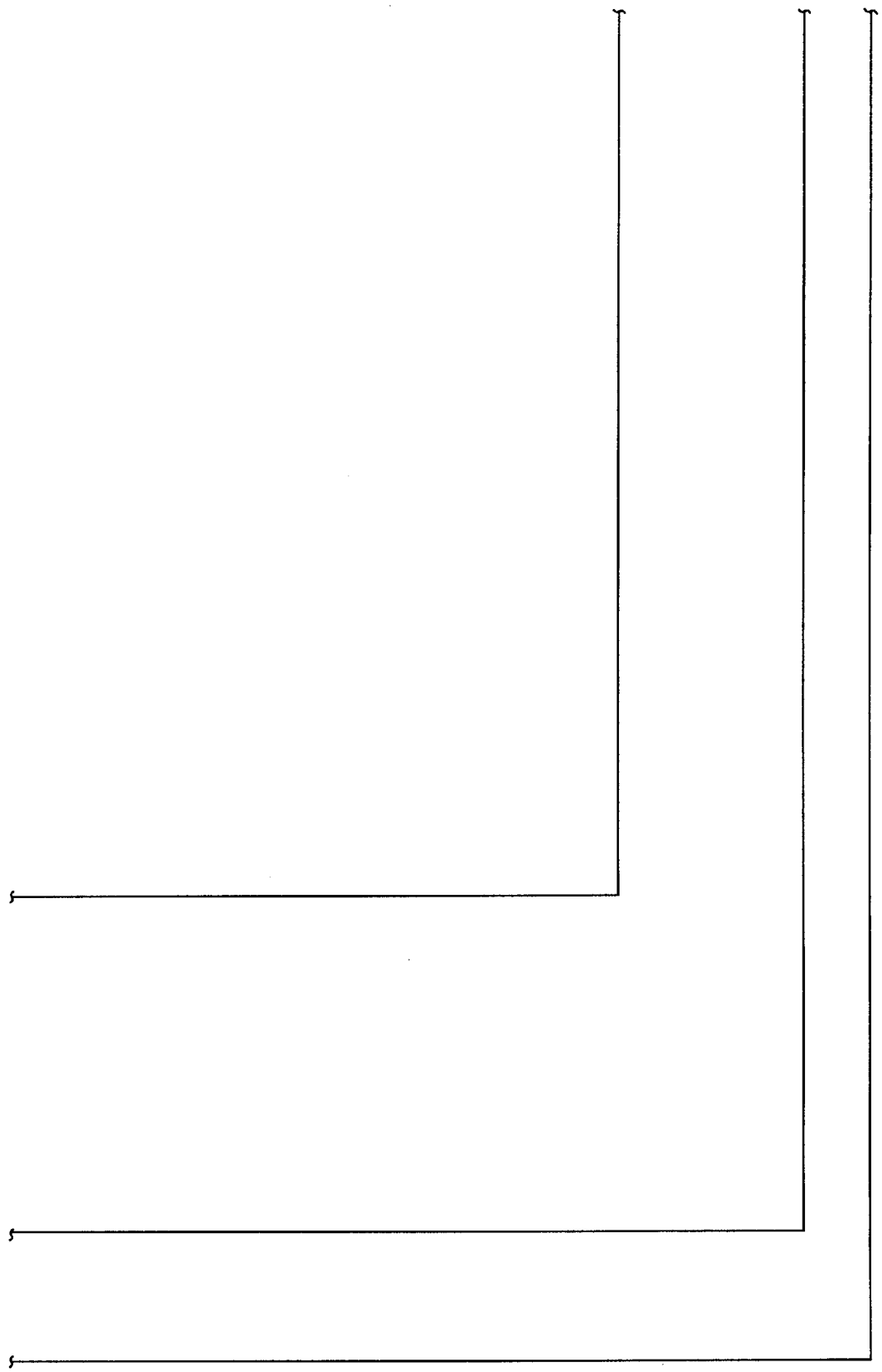
Figure 12A:
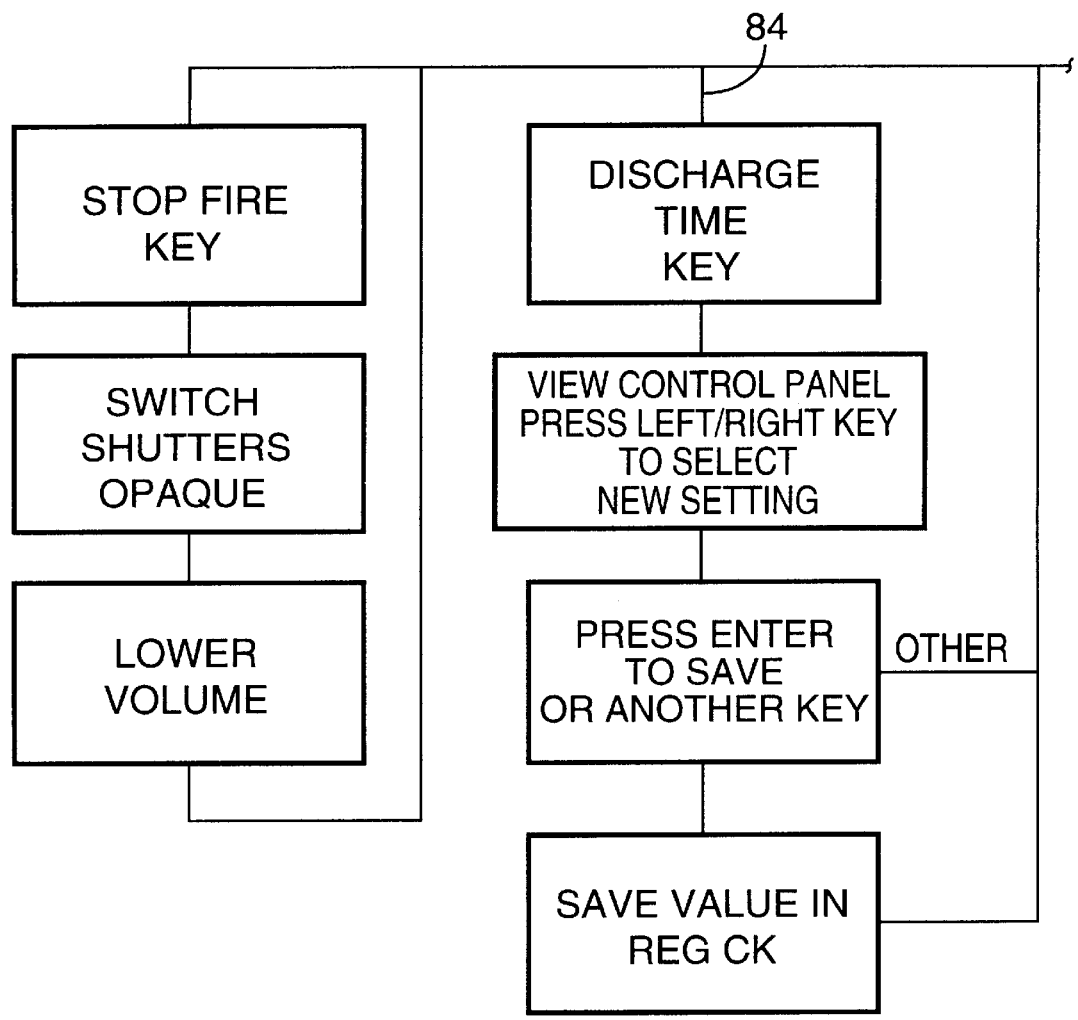
FIG. 12 is a flow diagram showing the interaction of the control panel of FIG. 9 during a simulation.
Figure 12B:
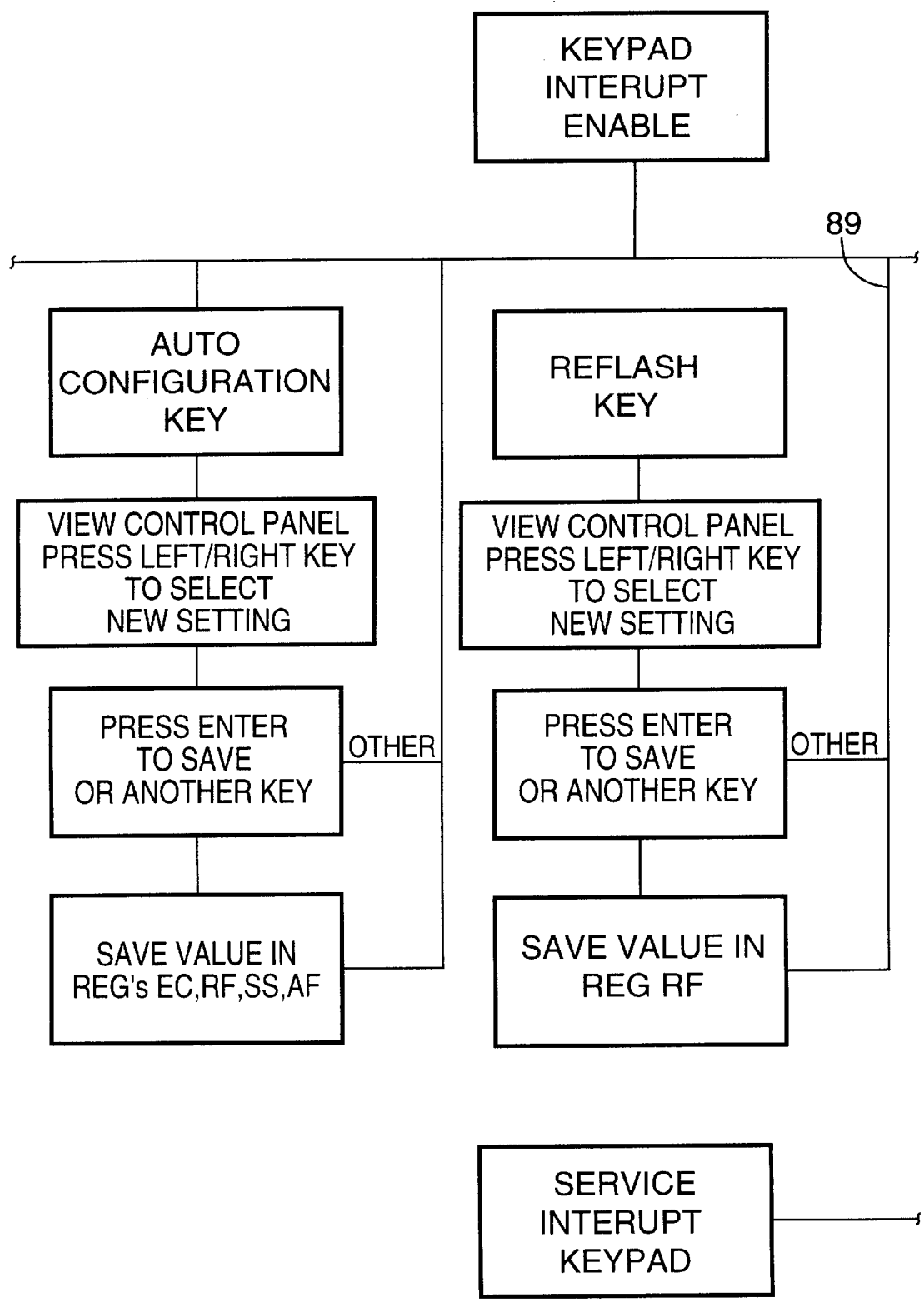
Figure 12C:
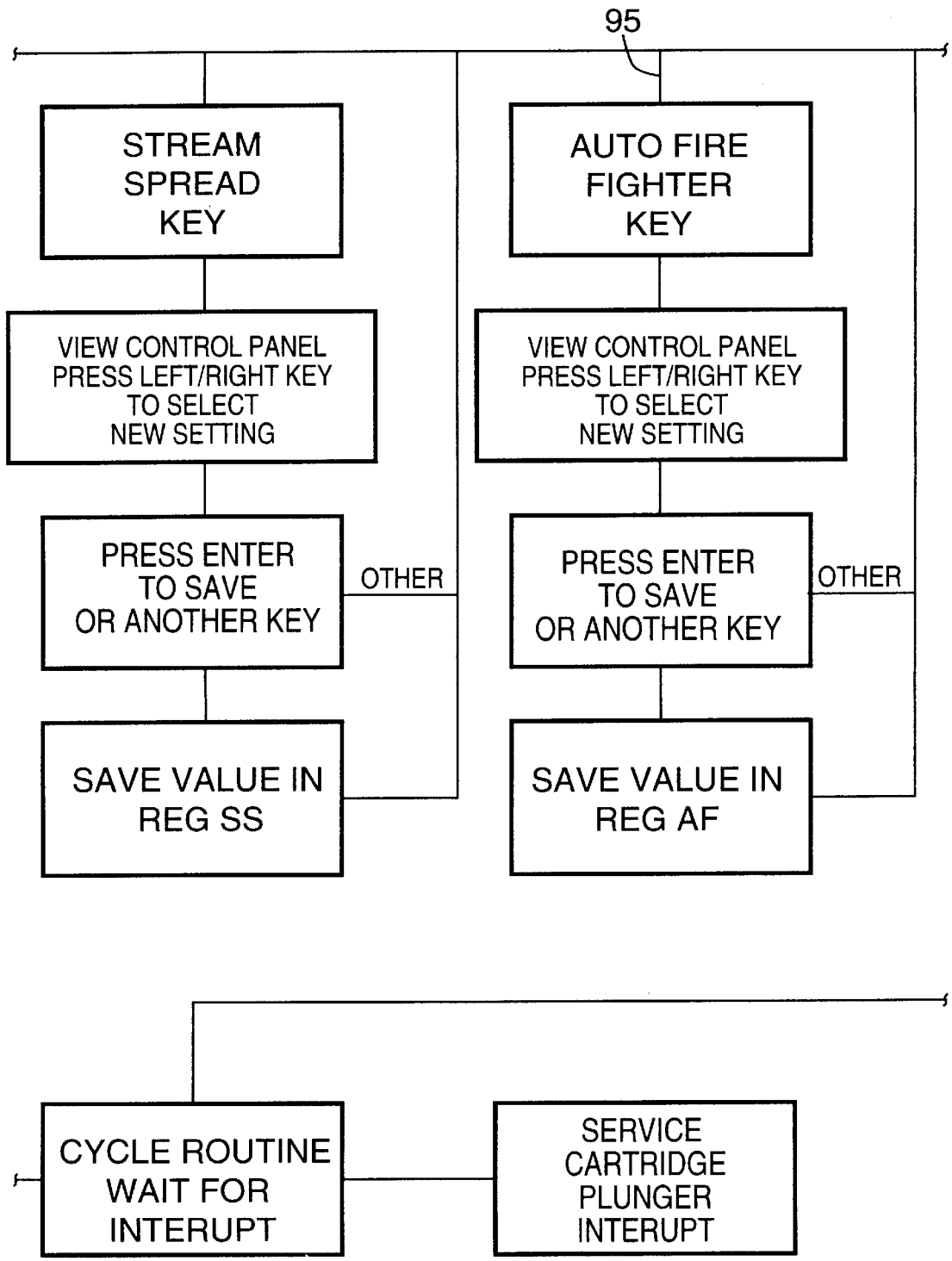
Figure 12D:
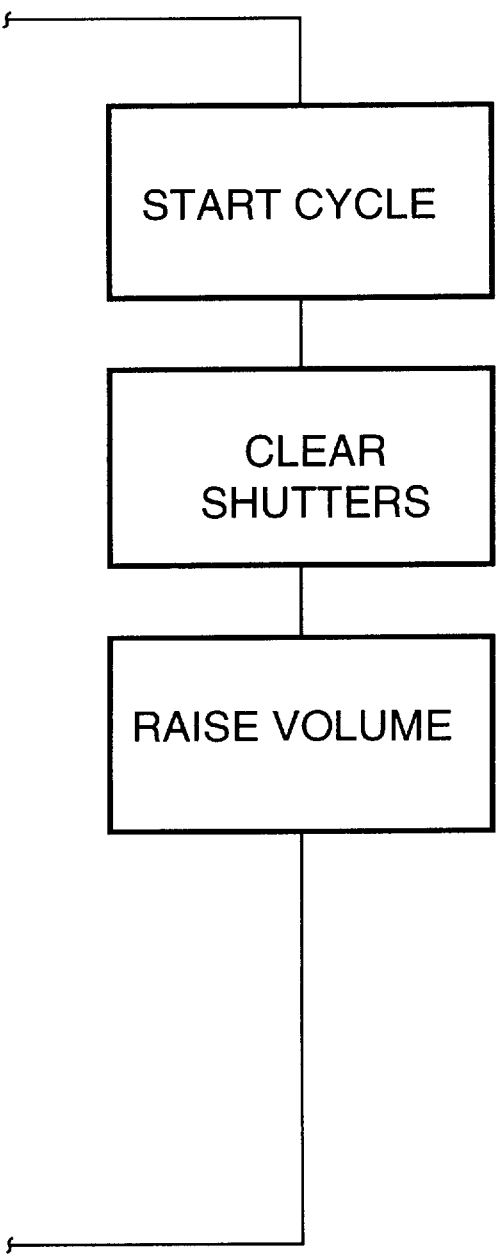

As noted above, controller 32 operates to simulate the characteristics of a fire as will now be described with reference to the flow diagrams shown in FIGS. 10, 11 and 12. In the specific embodiment disclosed, the controller 32 is a Motorola 68HC11A1 microcontroller although it will be appreciated that other controllers may be used with corresponding changes in the initialization and control strategy. The controller 32 also includes a keypad 66 and a viewing screen 68 monitoring the video image from the projector 16 as well as receiving messages from the controller regarding the operation of the simulator.

Figure 9:
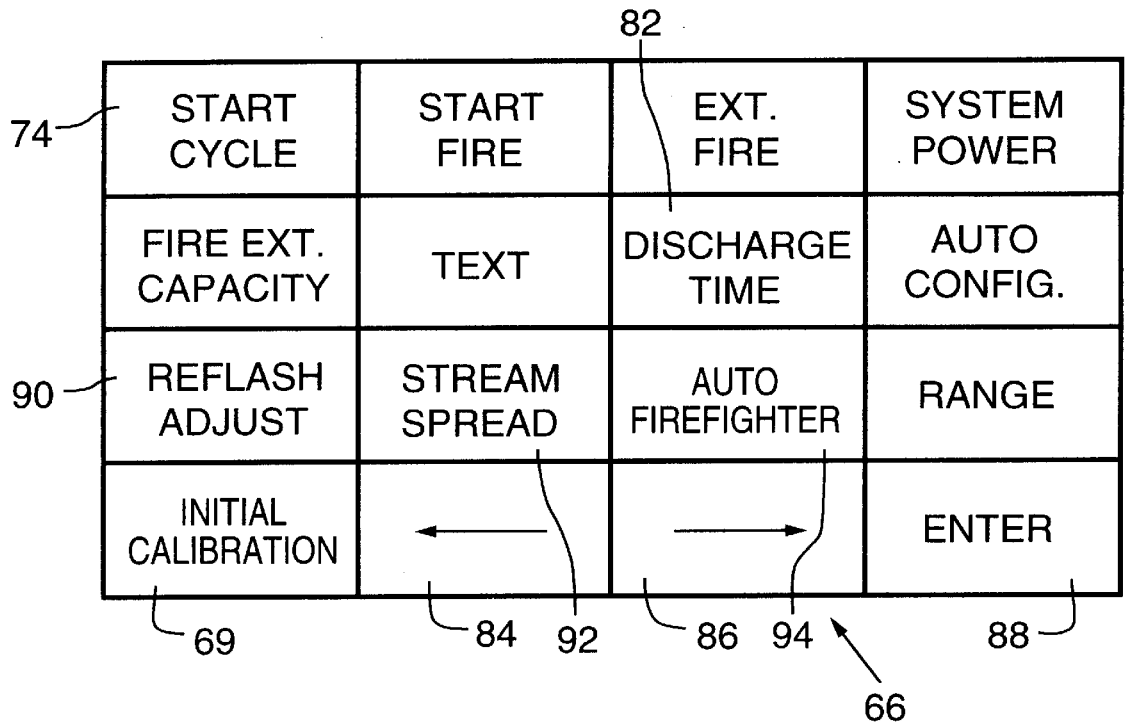
FIG. 9 is a representation of a control panel used on the simulator shown in FIG. 1.

Prior to running a series of fires or "cycling" the fire simulator the instructor first initializes the four or more infra-red detectors 36 located around the periphery of the rear projection screen 12 by pressing the Initial calibration key 69 on the keypad 66 (FIG. 9). Each detector 36 is assigned its own amplifier which uses a 100K digital potentiometer as a bias resistor. As shown in the first branch of the control strategy in FIG. 10, the computer 32 operates in an initialisation loop 70 to initialize the infra-red detectors sequentially by adjusting each infra-red detector amplifier via the digital potentiometer to the existing ambient light conditions. This is accomplished by measuring the amplified detector output and increasing or decreasing the resistance of the digital potentiometer until the measured output of the detector equals a predetermined voltage level. The detector output voltage is converted to a digital value by the on board a bit A/D convertor within the micro controller.

The instructor may continue the initialization as shown in sequence 72, by actuating the cartridge plunger and squeezing the nozzle of the extinguisher while viewing the LCD viewing screen on the control panel to confirm the computer has properly sensed these actions.

Figure 4:
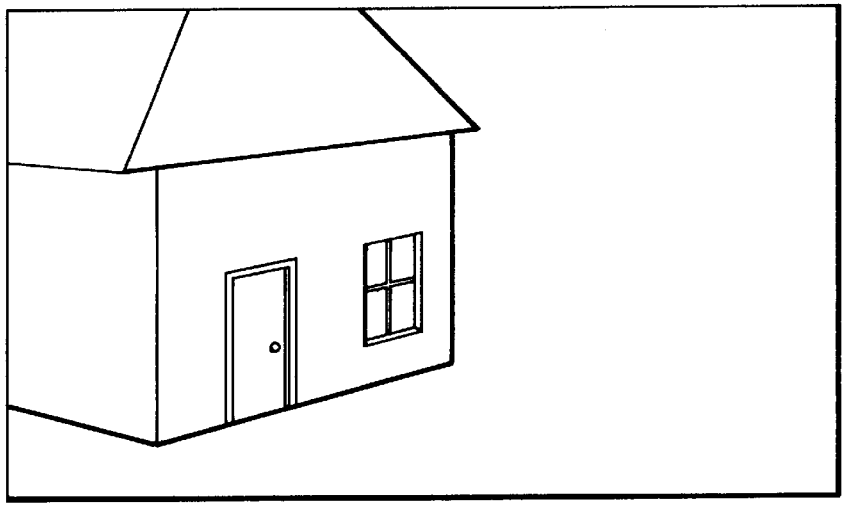
FIG. 4 is a depiction of an image projected by one of the components of the simulator of FIG. 1.
Figure 5:
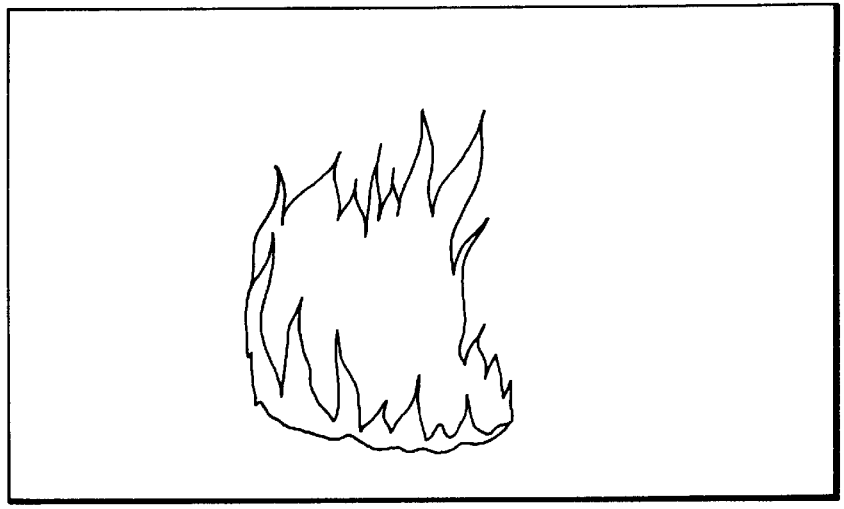
FIG. 5 is a depiction of an image projected by another component of the simulator shown in FIG. 1.
Figure 6:
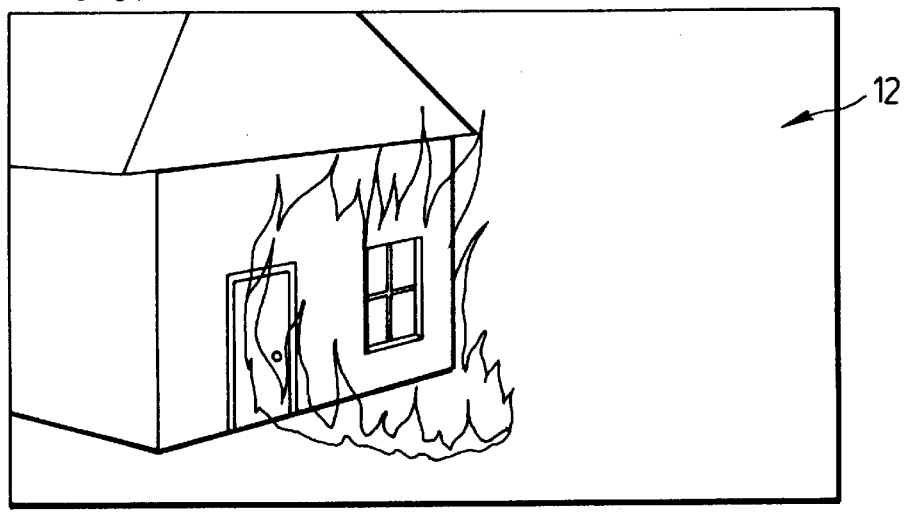
FIG. 6 is a depiction of the composite image formed by the projection of the images of FIGS. 4 and 5.

To begin a fire fighting sequence the instructor switches on the LCD projector and inserts a video tape of the fire to be simulated into the video player. An appropriate slide is placed in the slide projector and both projectors are equipped with special zoom lenses to minimize the distance between the projectors and rear projection screen. As shown in FIG. 4, the screen 12 will carry the image of the slide and the video image of the fire (FIG. 5) to provide the composite image shown in FIG. 6.

The instructor presses the start cycle key 74 on the keypad 66 which clears the cells 22 of shutter 20, raises the volume of the audio amplifier 28 and enables the cartridge plunger interrupt as indicated in sequence 76. The controller 32 is then conditioned to receive further input from either the operation of the extinguisher as shown in FIG. 11 or the keypad as shown in FIG. 12.

Assuming a student is to operate the extinguisher 40, the student who is standing approximately 10' from the screen actuates the fire extinguisher either by pressing on the cartridge plunger of a cartridge operated fire extinguisher or by pulling the ring pin on a stores pressure fire extinguisher. This causes a computer interrupt to occur which disables this interrupt and moves the program counter to the beginning of the simulation sequence shown in FIG. 11.

The micro switches 50 mounted on the extinguisher are monitored by the computer 32 which opens the solenoids located on the air compressor 60 allowing 30 to 50 psi air pressure to flow into the extinguisher 40. The student hears the extinguisher filling with air similar to that experienced with a cartridge operated extinguisher. An extinguisher pressurized light illuminates at the base of the screen 12 confirming the student has successfully pressurized the extinguisher 40 and a similar indicator also lights on the control panel 66.

The student then lifts the extinguisher 40 by the carrying handle 56 and when ready squeezes the extinguisher valve releasing compressed air from the nozzle. Provided the nozzle handle 56 has been opened sufficiently a "nozzle valve open" light will illuminate at the base of the screen 12 informing the instructor and a similar light will flash on the control panel 66. The infrared diode 44 and light 58 are activated and the student then sweeps the nozzle 42 at the base of the flames in an attempt to extinguish the fire in accordance with the instruction given.

The controller 32 monitors the infra-red detectors 36 located around the periphery of the screen 12 by comparing each detector output and identifying which detector is receiving the most infrared light as indicated in loop 76.

The controller 32 then compares the light output of the "winning" detector with a predetermined value and nullifies the result if the value is lower than the predetermined value. If the winning detectors' voltage is higher than the predetermined value the controller 32 enters a shutter control loop 78 and initially the computer generates a random number between 0 and 3. In the case of a four-detector shutter assembly 20 each detector is assigned five cells. The controller 32 will then switch opaque a specific cell 22 based on the random number in the group assigned to the winning detector. If the cells grouped within the control of the winning detector are all switched opaque the computer will attempt to identify the second highest detector and will compare the detector value against the predetermined standard value and will treat it in a similar fashion to the winning detector. If the second highest detector is lower than the predetermined value the computer will nullify the result and will return to interrogating the detectors once again.

Each time the controller 32 switches a cell 22 opaque it also sets the direction pin of the digital potentiometer of audio amplifier 28 low and sends one pulse decreasing the volume one step. Conversely during reflash when the controller 32 clears a cell it sends a single pulse increasing the volume by one step. In a 20 shutter system the controller 32 can increase the volume a maximum of twenty steps, each step equal to 100 ohms of resistance.

Each of the cells 22 blocks a specific portion of the image projected by projector 16 to the screen 12 to give the impression that that portion of the fire is extinguished. The projector of the slide image is not affected so that the composite image on the screen shows a progressively diminishing fire, as illustrated in FIG. 7. The shutter assembly 20 is placed out of the depth of focus of the LCD projector lens, typically 6 inches in front of the lens, so that a "soft" edge to the obliterated portion of the image is provided.

The infrared emitting diode located at the tip of the fire extinguisher nozzle is controlled by the computer. Once the detector measurements are completed the infrared led is switched off. In this approach the photo transistor diode is used as the infra-red detector however it is also desirable in more advanced systems to use a photo-diode in a similar technique which may also employ frequency shifting or other techniques commonly known for differentiating infrared light created by the emitter and ambient light. Commercially available pointing systems may be used which employ position sensitive infra-red detectors which are capable of detecting with greater precision the position of the infrared light beam on the screen. In this system a one or two dimensional Position Sensitive Detector (PSD) similar to the Hamamatsu S3979 is used.

While the controller 32 remains in the program loop waiting for the handle 56 to be squeezed or a key on the control panel 66 to be pressed it periodically enters a reflash routine loop 80 to check if any of the cells that are switched opaque should be cleared simulating a reflash of the fire which would occur in a real fire situation. When a cell 22 is switched opaque, the value representing the number of times the reflash routine has been cycled (reflash counter) is copied into another register (detector reflash counter) assigned to the winning detector. Each detector is assigned its own detector reflash counter. When the reflash routine is run the reflash counter is incremented and the result compared to each detector reflash counter. If a detector reflash counter is lower than the reflash counter less a predetermined value then reflash is enabled for that particular detector and one shutter in that group is switched clear and the volume raised one step. This method allows any shutter to remain opaque for a predetermined amount of time but will eventually be switched clear unless the detector reflash counter is refreshed which only occurs when a detector senses the infra-red light.

If a student successfully extinguishes the fire the cartridge plunger interrupt is enabled allowing the fire is to be reset by simply raising and then lowering the cartridge plunger in the case of a cartridge operated extinguisher.

If the student is unsuccessful, the discharge time for that extinguisher will be exceeded and the solenoid controlling the flow of compressed air will be shut off by the computer and the fire reflashed and the sound level raised.

Many parameters can be adjusted to suit individual preferences or different types of fires by use of the keypad 66 as shown in FIG. 12. The discharge time can be increased or reduced depending on the characteristics and size of the fire extinguisher being used as indicated in branch 82. The discharge time key 82 is depressed to access branch 4 (FIG. 12). The selected time may then be varied with arrow keys 84, 86, and the value stored with enter key 88.

The number of reflash cycles necessary before a cell will be switched clear can be adjusted by changing the spread between the detector reflash counter and the reflash counter necessary to switch a shutter clear as indicated in branch 89. This is accessed by reflash adjust key 90 and adjusted and saved by keys 84, 86 and 88.

In some instances it may be desirable to have more than one cell switched opaque at a time. This simulates a wide stream pattern where large areas of the fire may be extinguished simultaneously. A control panel stream spread key 92 has been provided for this purpose and can be adjusted to switch from one to 10 shutters opaque at a time by keys 84, 86, 88.

Some types of fires particularly vertical type fires may not engulf the entire rear projection screen in flames. The student concentrates on the center of the screen using vertical sweeping motions to attempt extinguishment. The extreme left and right sides of the screen are ignored by the student since no fire is present. An auto fire fighter feature is available which will ensure the fire is extinguished provided a set minimum number of shutters have already been switched opaque. A keypad adjustment 94 on the control panel 66 provides adjustment as shown in branch 95 for the number of shutters that must be opaque before the auto fighter is activated to insure the fire is completely extinguished. This is accomplished by monitoring how many steps the volume has been lowered, one step for every shutter and switching all shutters off when the number of shutters switched opaque plus the value of the auto fire fighter adjustment is equal to or greater than 20 in the case of a 20 shutter system.

Some fires may respond differently to the applications of dry chemical agent. To control the speed at which the fire is extinguished the amount of time the computer program spends in the delay loop can be adjusted to speed up or slow down the entire fire extinguishing cycle.

It will be apparent that the simulator provides a sturdy compact assembly that can readily be used to simulate a fire and which responds accurately and realistically to the activities of the student. It would, of course, be apparent that alternative configurations may be used, such as by utilizing a single detection assembly 34 that may predict the point of impingement of the IR beam or by incorporating the function of the shutter assembly into the LCD projection screen. In this case, the video signal will have the shutter operation superimposed to diminish the projected image. Similarly, although a video projector has been shown, it will be apparent that other forms of image projection devices can be used, such as a CD ROM storage facility incorporated into the controller 32 that will be effective to generate the required pattern of images on a display screen of suitable size.

In this case the image generation and projection may utilise a fixed device driven by a computer with the shutter either integrated in the control to the pixel device or an a separate LCD panel out of the depth of focus of the pixel unit.

It has been found convenient to record the image of the flames at night thereby ensuring a minimum of background.

An alternative control strategy is shown in FIGS. 13 to 17 which may be used with the apparatus shown in FIGS. 1 to S. In the embodiment of FIGS. 13 to 17 the effect of extinguisher 40 is balanced by effect of the fire consuming more fuel. In this manner a realistic simulation is provided which reflects the technique used to extinguish the fire an well as the characteristics of the fire being fought.

Figure 13:
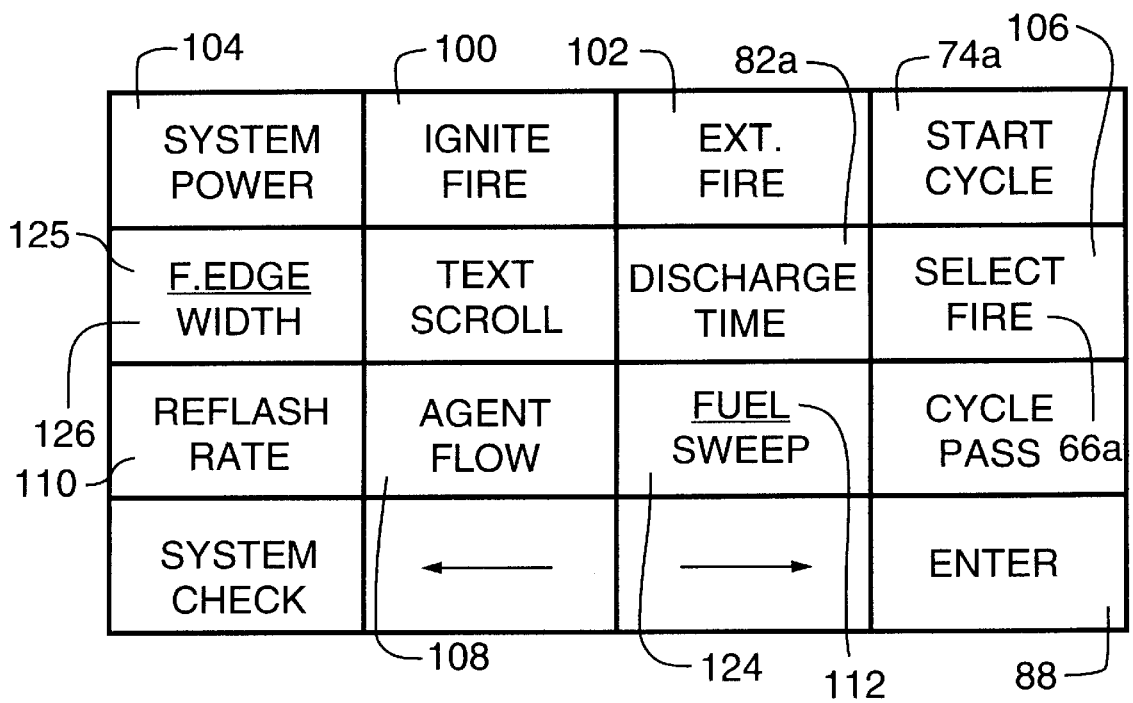
FIG. 13 is a view similar to FIG. 9 of an alternative embodiment of control panel.

Referring therefore to FIG. 13, a control panel 66a includes control 82a to establish the discharge time of extinguisher, a control 74a to start the simulation cycle as well as the controls for starting the fire (100); extinguishing the fire 102 and a power switch 104.

The characteristics of a number of preselected types of fire are stored in the controller 32a and one of the available fires may be selected from the "Fire Type" control 106. A list of possible fires is displayed on screen 68a, e.g. pan fire, vertical fire, spill fire as well as a "custom fire" option. The required fire type may be selected by the enter button 88.

Each fire type has two values associated with it, namely an "Apply agent Horizontally" (AH) value and an "Apply Agent Vertically" (AV) value. Each is stored in a respective register 114,116 of controller 32a. The selection of a fire type also preselects a fuel type value which is stored in register 118 and a reflash value stored in register 120. The fuel type value represents a threshold to determine whether or not a fire at a particular location is 'burning' or extinguished as will be described more fully below.

These values for AH, AV, fuel type and reflash value may be customized during selection by use of individual controls on panel 66a, namely Extinguishing Agent flow rate 108, Reflash rate 110, fuel control 112 which will adjust the respective values in registers 114,116,118,120.

The "custom fire" selection allows selection of a degree of difficulty on a scale of 1 to 10 to apply to a particular fire. This simply adjusts the register values appropriately.

An important factor in fighting a fire is the sweep of the fire made by the extinguisher. Too fast a sweep may not provide sufficient agent to extinguish the fire whereas too slow a sweep will concentrate the agent at one location. To monitor this effect and compensate accordingly a sweep function is provided. The sweep achieved is based on the history of the impingements and is tracked by a FIFO 138 that stores the locations of preceding impingements. The number of values stored depends upon the type of fire selected and its initial value set when the fire type is chosen.

A longer history may be obtained with more samples if required. The length of the history can be adjusted from control panel 66a through sweep control 124 that increases or decreases the number of samples stored in the FIFO 138. The sweep of the fire is determined by monitoring the contents of the FIFO 138 and selecting the extreme locations from the stored samples which are then used as limits for the sweep.

Two further characteristics that are used in the simulation are the fire width, which limits the lateral extent of the fire by maintaining the outermost shutters closed, and the 'front edge' which simulates the effect of initial impingement of the agent on the fire. Both of these will normally be selected with the fire type by default but can be overridden by controls 125,126.

After selection of the fire characteristics the simulation may be initiated by clearing the shutter elements 22. This may be done from the ignite fire control on panel 66a or, preferably from a parallel switch on the extinguisher and operating the start cycle control. At the start of a simulation, all of the cells 22 are open so that a fire is seen across the whole width of the screen to engulf the projected image. If the width of the fire has been restricted then the shutters will be closed to simulate a vertical fire.

Controller 32a regulates the appropriate state of the cells 22 of shutter 20 by allotting an address for each in a memory 16 shown schematically in FIG. 14. The value stored in a particular location is compared with the value in fuel register 118 by comparator 128. If the value exceeds the fuel register the comparator 128 provides a high or '1' output and the cell corresponding to that location is maintained open. If the value is less than that of fuel register 118 then a low or '0' output is provided by comparator 128 and the corresponding cell is closed.

The contents of memory 126 are read sequentially, compared with the register 118 in comparator 128 and a bit string fed to the shutter 20 indicating the calls that should be open and those that should be closed.

Upon initialization each location in the memory 126 is provided with a full count.

Initiating the simulation also initiates the monitoring of the I.R. detectors 36 as best seen in FIG. 15. In this embodiment the detectors 36 are prepackaged infrared receivers that sense a 38 kHz frequency infrared beam emitted by the diode 44. This prevents the detectors from being saturated by ambient light which is filtered out by the integrator in the detector. Four detectors are spatially located and a timer is initiated when the diode 44 is switched on at the sample interval. The detectors' response times are dependent on the angle of the beam in relation to the face of the detector and the order of the response and the time lag between the responses is used to determine the location of impingement as will be explained below.

A counter 130 maintains the interval between samples and a timer 132 ensures that the discharge time of the extinguisher 40a has not been exceeded. When a sample is to be taken, the I.R. detectors 36 are activated and a location on the screen determined for the impingement point of the I.R. beam. This is determined by forming an 8 bit word, the first two bits of which indicate the first detector to respond, the second two bits the second detector to respond and the last four bits the interval between the responses. If at this time the extinguisher has not been activated then no location is allocated but assuming that the extinguisher has been activated, the 8 bit word will be matched in a look up table of possible bit combinations as indicated at 133.

That combination is correlated to a particular shutter by the 'assign shutter' routine 134 which is then fed to a shutter selector 136. The selector 136 determines whether or not the allocated cell is already closed. If it is open then the allocated cell is selected but if it is closed then the next cell based on the sweep pattern of the extinguisher is selected. The selected location is then stored in FIFO 138 (FIG. 14) along with the four previously selected cells 22 to provide the historical basis for determining the sweep.

The values of the most recently swept locations are extracted from the memory 126 for updating by the agent effectiveness and reflash routines shown generally in FIG. 15 and specifically in FIGS. 16 and 17. Referring initially to FIG. 15, the effect of applying the agent at the most recent of the selected locations as stored in FIFO 138 is first computed at the Apply Agent horizontal step 140 and Apply Agent Vertically step 142. Thereafter, the shutter states in memory 126 are evaluated for reflash at the 'Cause Reflash Horizontal' stop 144 and 'Cause Reflash Vertically' step 146.

After the values in each location are updated, the width of the fire is checked against the fire width limits and any overflow extinguished by decrementing the values in the memories at those locations.

The values in memory 126 are then scanned to produce a bit string which in turn is passed to the shutter control by the shutter data transmit function 148.

The updating of the memory values as a result of the extinguisher at the selected location is shown in FIG. 16. The most recent of the points of impingement is read from the UFO 138 and the stored values for the selected location and the locations to either side are retrieved from the memory 126.

One half of the Agent Horizontal value AH from register 114 is then subtracted from the value of each of the adjacent registers (SA less 1) and the whole AH value from the selected location SA. The values in those locations are thus adjusted for comparison with the threshold value to determine if the fire is extinguished at that location. This process is repeated for each of the locations stored in the FIFO 138 so that the values at each location are decremented.

A similar adjustment is then made on the row of shutter elements vertically above the selected element to adjust for the vertical effect of the extinguisher. The AV value in register 116 is used so that each element corresponding to a location above and to one side of the selected location is decremented by one half of AV and that immediately above is decremented by the full value of AV. Again this is repeated for each location in FIFO 138 and the values in memory 126 are updated for subsequent comparison. The subroutine shown in FIG. 16 thus determines the effect of the extinguishing agent but in a realistic fire there is always the possibility of reflash.

Reflash is simulated using the subroutine shown in FIG. 17 and again adjusts the values in the memory 126 to determine if the fire will reflash.

For realistic simulation it is determined that reflash will not occur within the sweep of the extinguisher and also that reflash can only occur when adjacent a burning location.

The subroutine shown in FIG. 17 scans each location in the memory 126 and initially determines whether or not both of an adjacent pair of cells lie within the sweep area. If they do, then no adjustment is made and the next address selected to form a further pair of elements that are compared.

If both addresses are outside the sweep area then the values stored in memory 126 are compared with the threshold value stored in register 118. If both are below the value then it indicates that both are extinguished and reflash cannot occur. The next pairing of addresses are then chosen.

When the values at one or both locations are above the threshold then the difference between the two is taken and multiplied by the reflash value in register 120.

The computed value is then added to the lowest value in the addresses being compared to provide a new value at that location.

This process proceeds through each location and then is repeated with vertically aligned shutters identified as SA and SA+10 for a 10×2 shutter array. Again the lower value is updated.

With the values in memory 126 updated for both the effect of the agent and the effect of reflash, the values are compared and a shutter control string generated and applied to the shutter interrupt, FIG. 15. Once an interrupt is received the shutter string is transmitted to the shutter 20. If during updating, a value at an address in the memory falls below the threshold then the corresponding cell 22 in shutter 20 will be closed giving the appearance of he fire being extinguished. Similarly, if the threshold is exceeded due to reflash then the corresponding cell will open to regenerate the fire.

This process is repeated at regular intervals until either the fire is perceived as extinguished or the time for the extinguisher contents expires.

At the start of the sampling, the 'Front Edge Width' values are used to decrement the contents of the memory adjacent to the point of impingement by a set value to give the usual impression of the 'Knockdown' that occurs when the agent is initially applied. This value is removed after the initial sample. Similarly, during simulation a realistic flickering may be obtained by 'toggling' the shutters at the edge of the fire between on and off conditions.

The updating of the values at the addresses in memory 126 continues between samples of the detectors 36 so that progressive and continuous change of the shutter 20 occurs. As the next sample is taken by the detectors 36 the new location is fed to the FIFO 138 and the oldest of the samples is deleted. Each location in FIFO 138 will therefore be adjusted by the agent effectiveness routine over a number of sample periods to simulate the progressive action of the extinguisher agent.

It will be seen therefore that a versatile yet robust simulator is provided that can be adapted to a wide variety of conditions to produce a realistic simulation of a fire.

It will be apparent that alternative detection devices may be used such as a camera having a CCD screen. The scanned output from the screen may be monitored to determine the maximum signal and a corresponding location determined.

The shutter assembly 20 has been shown with discrete elements 22 but it will be appropriate that a LCD module may be used in its place. This permits random or irregular shapes to be occluded.

I claim:

1. A method of simulating the response of a fire to an extinguishing agent comprising the steps of projecting an image of a fire on to a screen, determining the impingement location of a beam representing a stream of extinguishing agent on said screen, adjusting control associated with said image in a manner to occlude portions thereof directly associated with said impingement location and to occlude neighboring portions thereof indirectly associated with said impingement location and polling predetermined locations spaced on said image to adjust said control in a manner to restore said image to portions associated with said predetermined locations.

2. A method according to claim 1 wherein said control includes a shutter having a plurality of shutter elements positioned to occlude respective portions of said image when in a closed state.

3. A method according to claim 2 wherein said predetermined locations correspond to each element of said shutter and said polling monitors the state of said shutters.

4. A method according to claim 2 wherein each shutter element attains a closed state when a control value associated therewith crosses a threshold reference value, said control value being directly adjusted upon impingement of said beam at a location corresponding to, that shutter element and indirectly adjusted upon impingement of said beam at a location adjacent to that shutter element.

5. A method according to claim 4 wherein polling of said elements includes ascertaining said control values for each of said elements and comparing said control values with said reference values.

6. A method according to claim 5 wherein said control value of selected ones of said shutter elements is adjusted periodically in an opposite sense to that caused by impingement.

7. A method according to claim 6 wherein control values associated with a plurality of locations are adjusted for each impingement.

8. A method according to claim 7 wherein successive impingement locations are retained and an adjustment made to each for a preset number of impingements.

9. A method according to claim 8 wherein said retained locations are monitored and the sweep of said extinguisher determined therefrom.

10. Apparatus for simulating the response of a fire to an extinguishing agent comprising a screen, a projector to project an image of a fire on said screen, detectors to detect an impingement location of a beam representing a stream of extinguishing agent on said screen, a shutter assembly having a plurality of shutter elements each operable to occlude a respective portion of said image when in a closed state and a control to control said shutter elements and adjust said elements between an open state and said closed state, said control adjusting a shutter element directly associated with said impingement location toward a closed state upon detection of said impingement, adjusting adjacent shutter elements indirectly associated with said impingement location, and adjusting predetermined shutter elements toward an open state periodically to simulate reflash of said fire.

11. Apparatus according to claim 10 wherein said control includes a control value associated with each of said elements and a threshold value, said control comparing said control value with said threshold value to determine the state of said shutter element.

12. Apparatus according to claim 11 wherein said control adjusts said control value upon detection of an impingement at a location associated with said element.

13. Apparatus according to claim 10 including a supplementary projector to project an image of an object on said screen to superimpose said image of said fire on said object.

14. Apparatus according to claim 10, further including a visible light beam for illuminating said impingement location.

* * * * *